United States Patent
Miyairi et al.

(10) Patent No.: US 11,280,243 B2
(45) Date of Patent: Mar. 22, 2022

(54) CATALYST SUBSTRATE, METHOD OF MANUFACTURING THE SAME, AND EXHAUST GAS PURIFICATION APPARATUS

(71) Applicants: NGK INSULATORS, LTD., Nagoya (JP); FAURECIA SYSTEMES D'ECHAPPEMENT, Nanterre (FR)

(72) Inventors: Yukio Miyairi, Nagoya (JP); Masaaki Masuda, Nagoya (JP); Jean-Paul Brunel, Nanterre (FR)

(73) Assignees: NGK Insulators, Ltd., Nagoya (JP); Faurecia Systemes D'Echappement, Nanterre (FR)

( * ) Notice: Subject to any disclaimer, the term of this patent is extended or adjusted under 35 U.S.C. 154(b) by 296 days.

(21) Appl. No.: 16/385,314

(22) Filed: Apr. 16, 2019

(65) Prior Publication Data
US 2019/0323401 A1 Oct. 24, 2019

(30) Foreign Application Priority Data

Apr. 18, 2018 (JP) .............................. JP2018-080108

(51) Int. Cl.
*F01N 3/28* (2006.01)
*B01J 35/04* (2006.01)

(52) U.S. Cl.
CPC ............ *F01N 3/2825* (2013.01); *B01J 35/04* (2013.01); *B01D 2255/2047* (2013.01); *B01D 2255/30* (2013.01)

(58) Field of Classification Search
None
See application file for complete search history.

(56) References Cited

U.S. PATENT DOCUMENTS

| | | | |
|---|---|---|---|
| 2002/0175451 A1* | 11/2002 | Vance et al. | ............ C04B 33/32 264/631 |
| 2015/0075137 A1 | 3/2015 | Crawford et al. | |
| 2017/0014765 A1 | 1/2017 | Crawford et al. | |
| 2017/0022868 A1 | 1/2017 | Crawford et al. | |
| 2017/0226907 A1 | 8/2017 | Crawford et al. | |

FOREIGN PATENT DOCUMENTS

| | | |
|---|---|---|
| CN | 107270311 A | 10/2017 |
| EP | 3 174 369 A1 | 5/2017 |
| JP | H11-336534 A1 | 12/1999 |
| JP | 6243041 B2 | 12/2017 |

OTHER PUBLICATIONS

Extended European Search Report (Application No. 19169520.4) dated Aug. 13, 2019.

\* cited by examiner

*Primary Examiner* — Colin W. Slifka
(74) *Attorney, Agent, or Firm* — Burr & Brown, PLLC

(57) ABSTRACT

A catalyst substrate may include a ceramic base body including first and second ends, the second end being opposite to the first end, and the ceramic base body being provided with a plurality of cells each extending between the first and second ends; and a plurality of metal particles or metal fragments introduced into one or more internal spaces of one or more selected cells in the plurality of cells. Each of the plurality of metal particles or metal fragments has a size equal to or less than an opening width of the cell. The plurality of metal particles or metal fragments is configured to generate heat in accordance with varying magnetic field.

14 Claims, 17 Drawing Sheets

[Fig. 1]
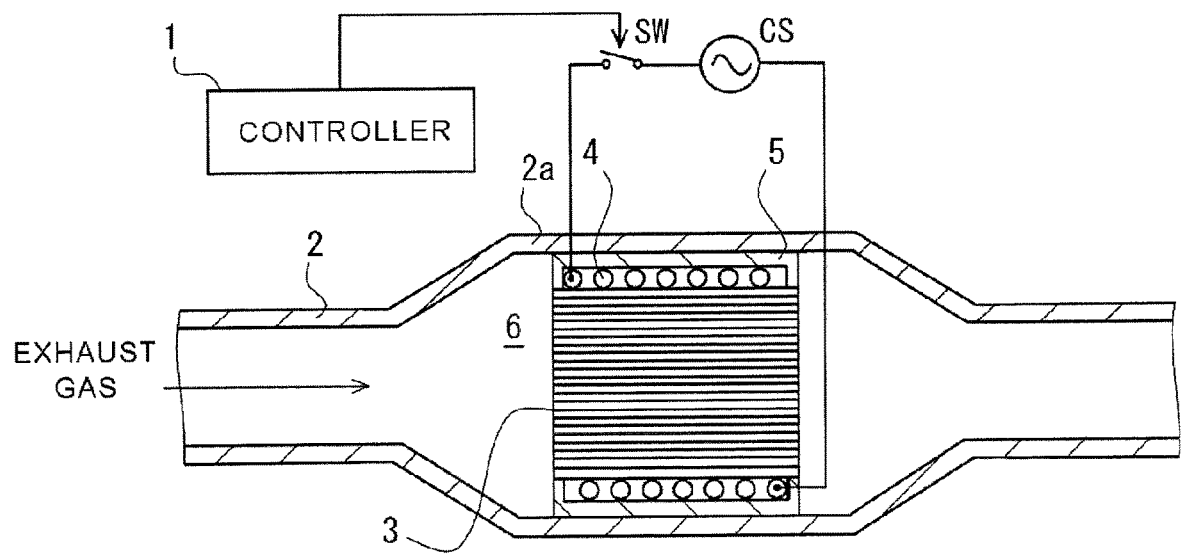
[Fig. 2]
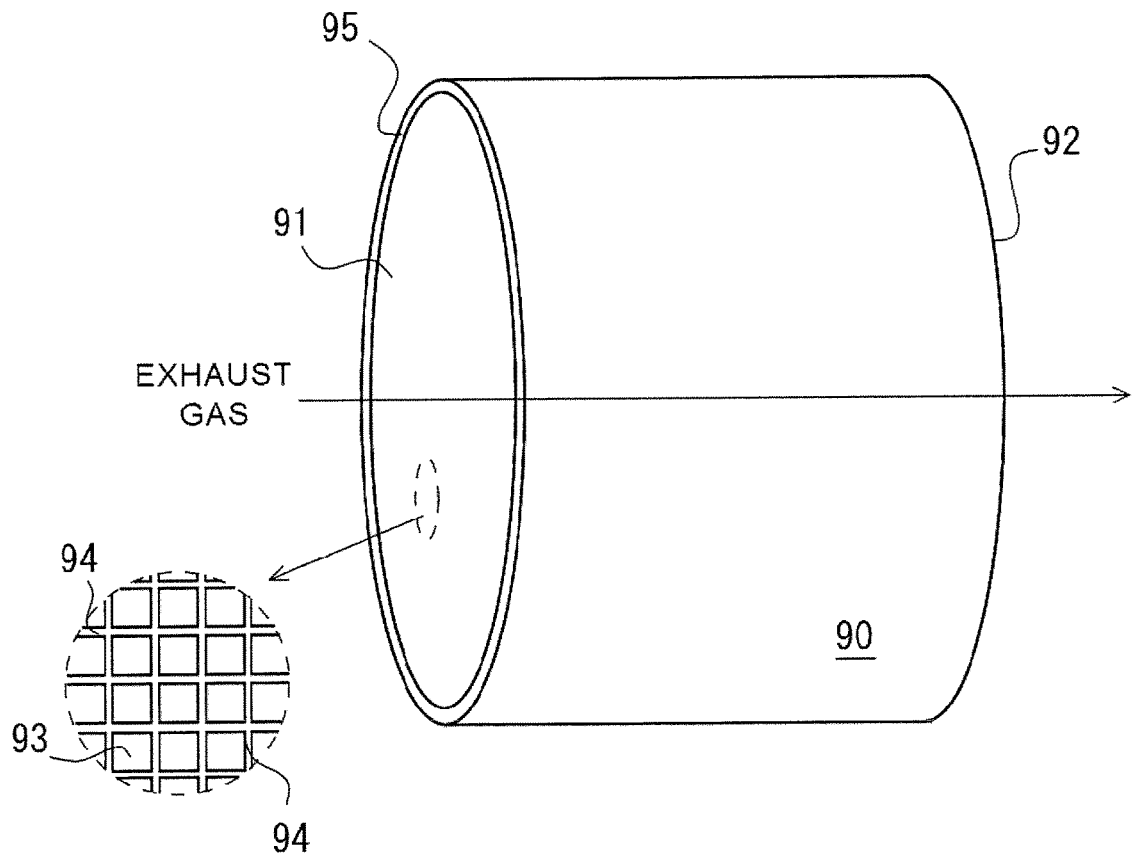

[Fig. 3]
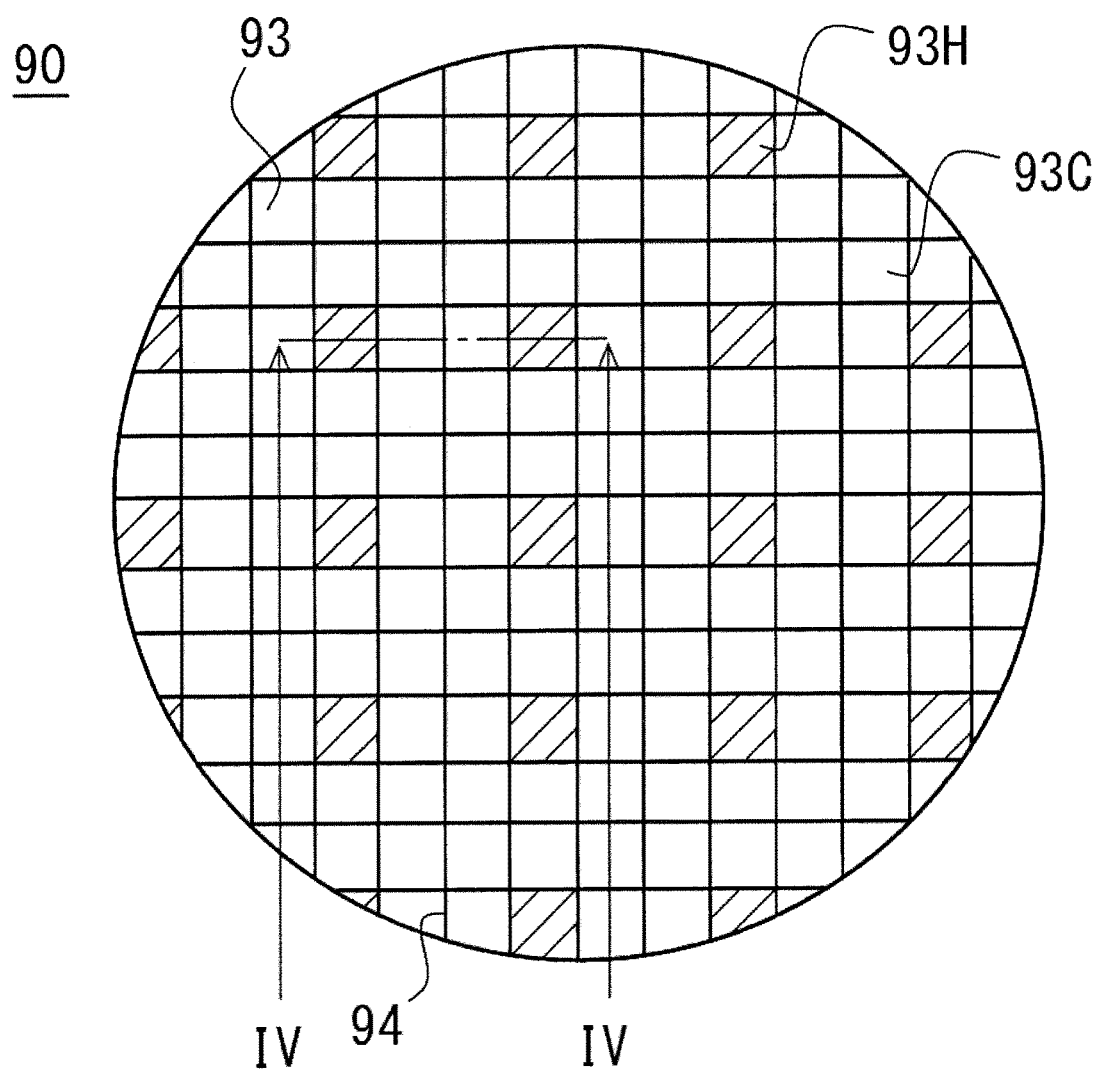

[Fig. 4]
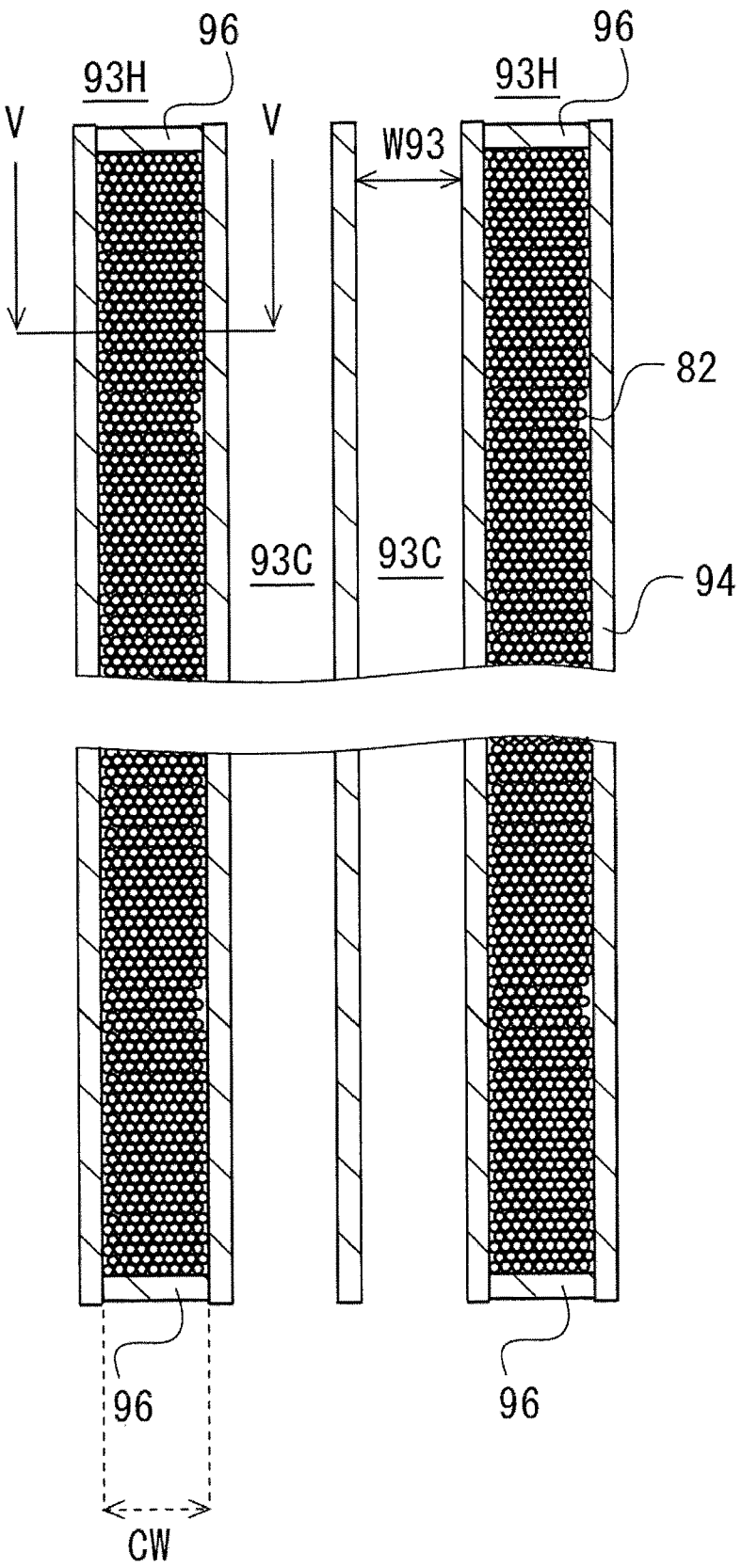

[Fig. 5]
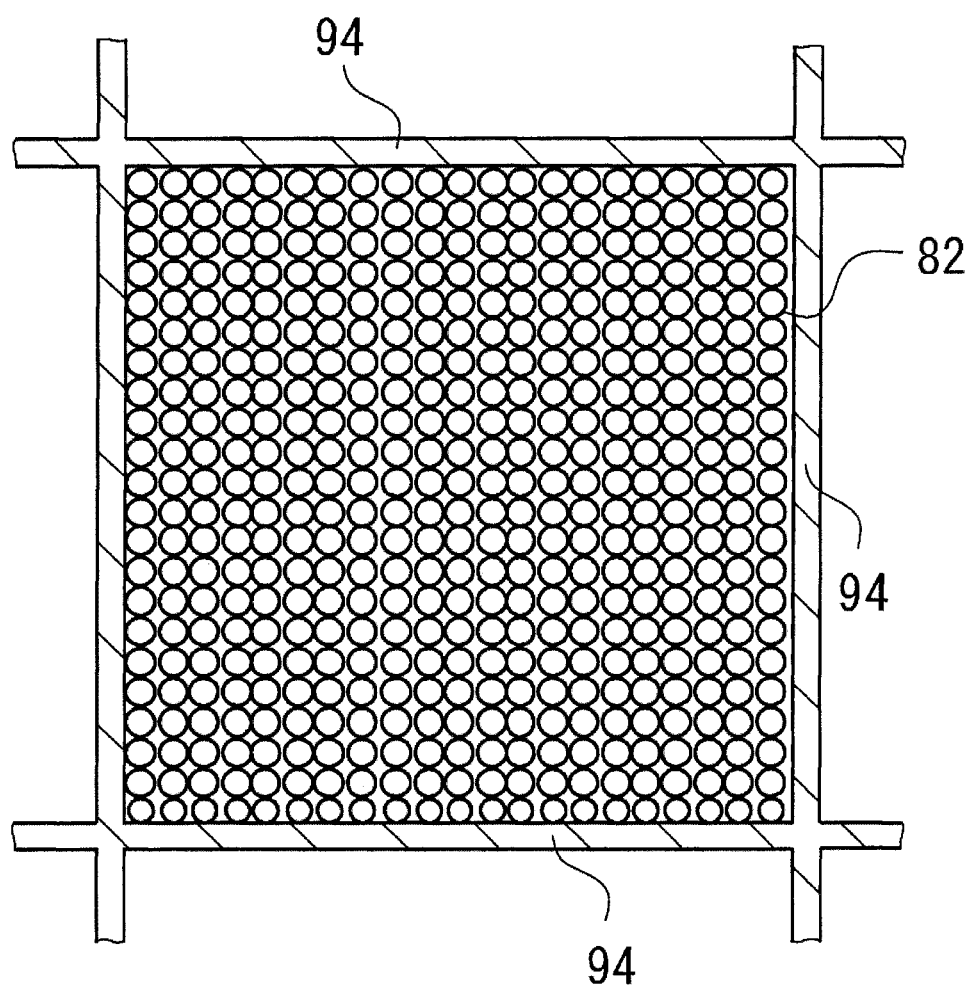

[Fig. 6]
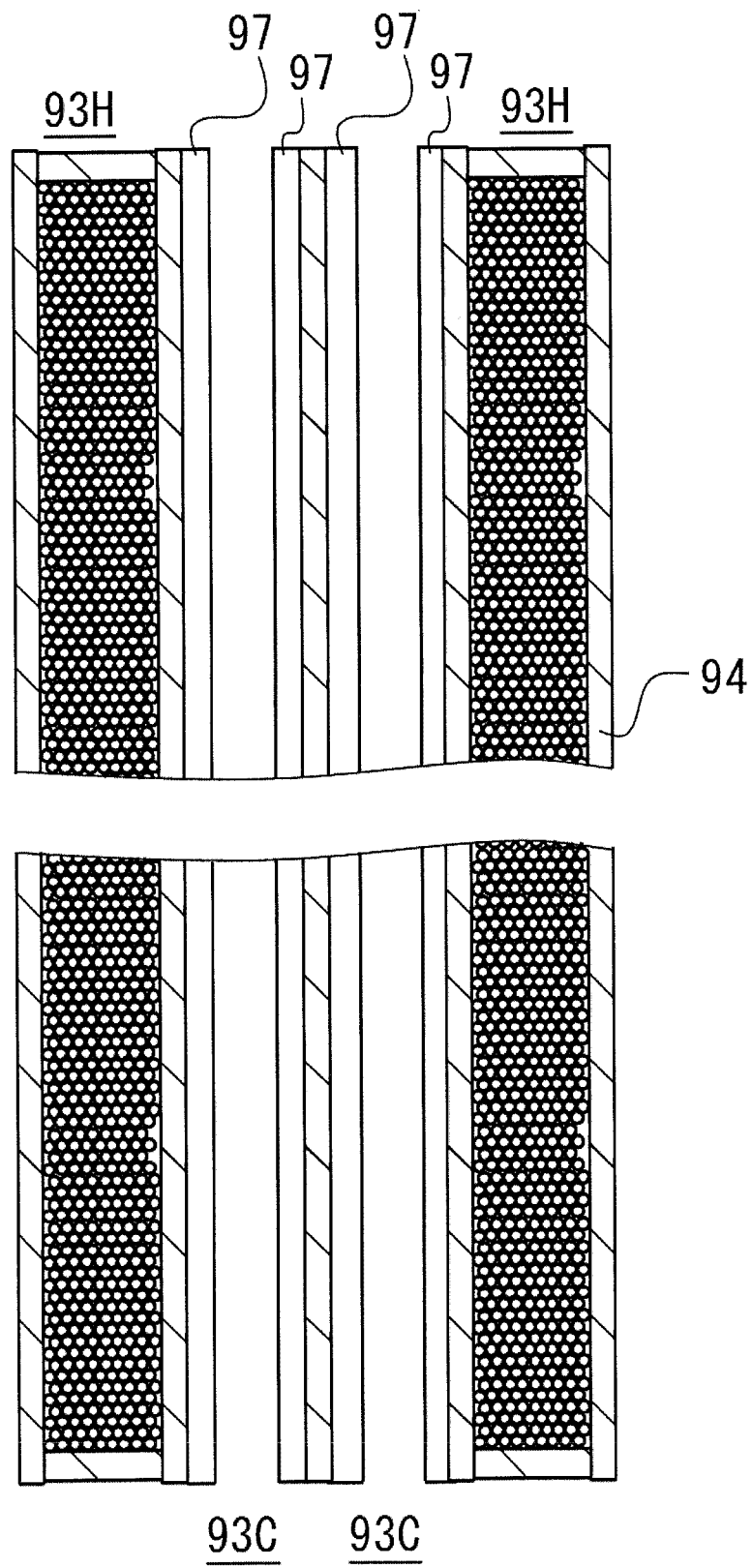

[Fig. 7]
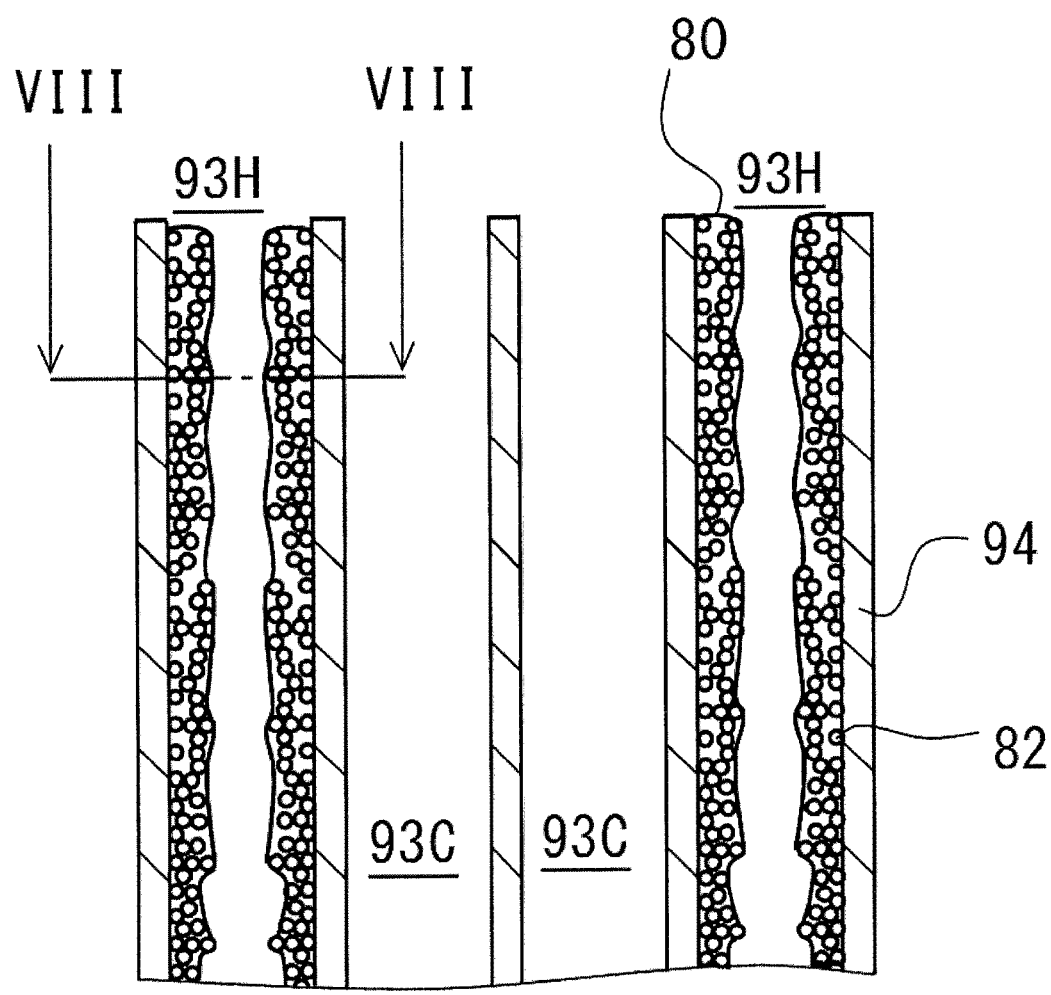

[Fig. 8]
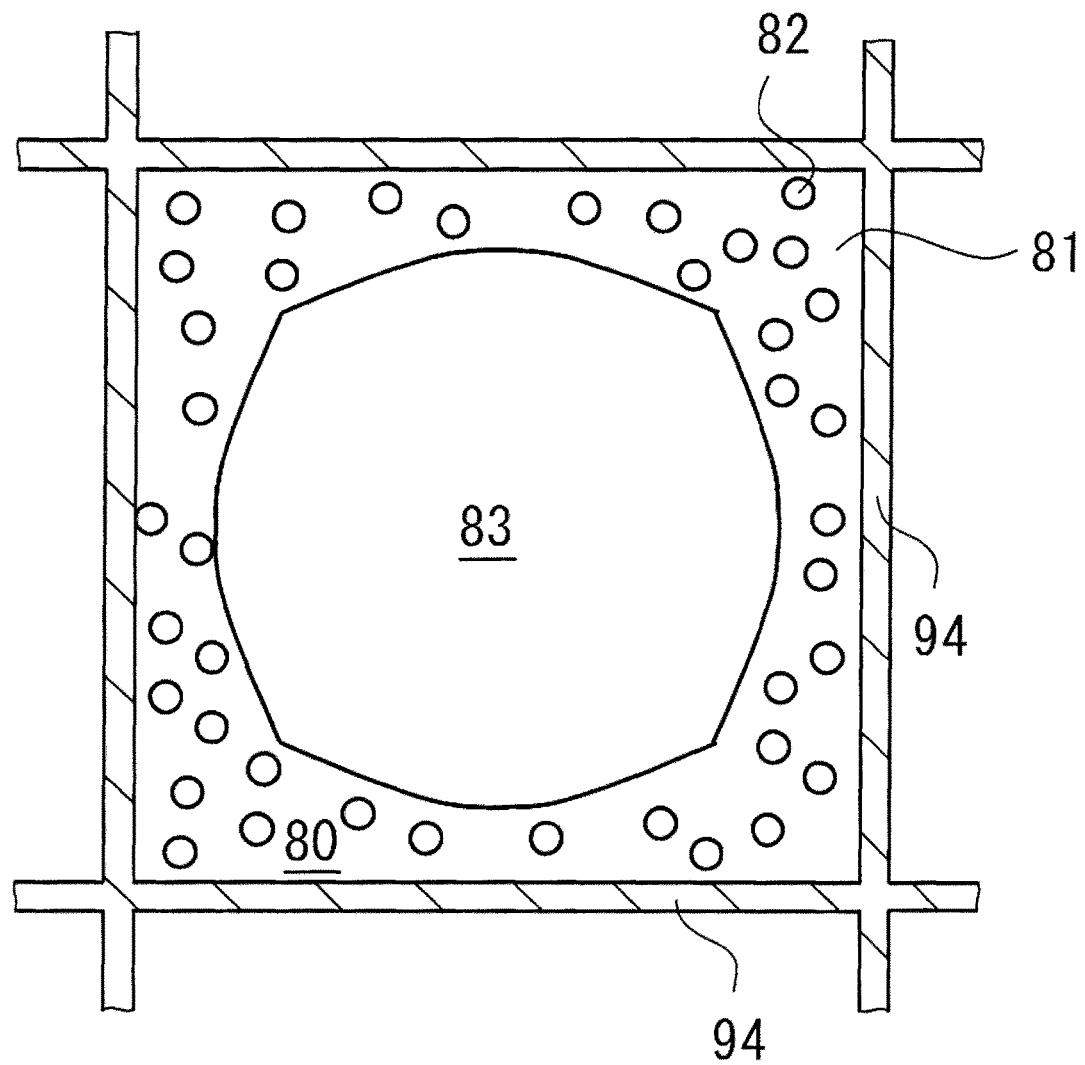

[Fig. 9]
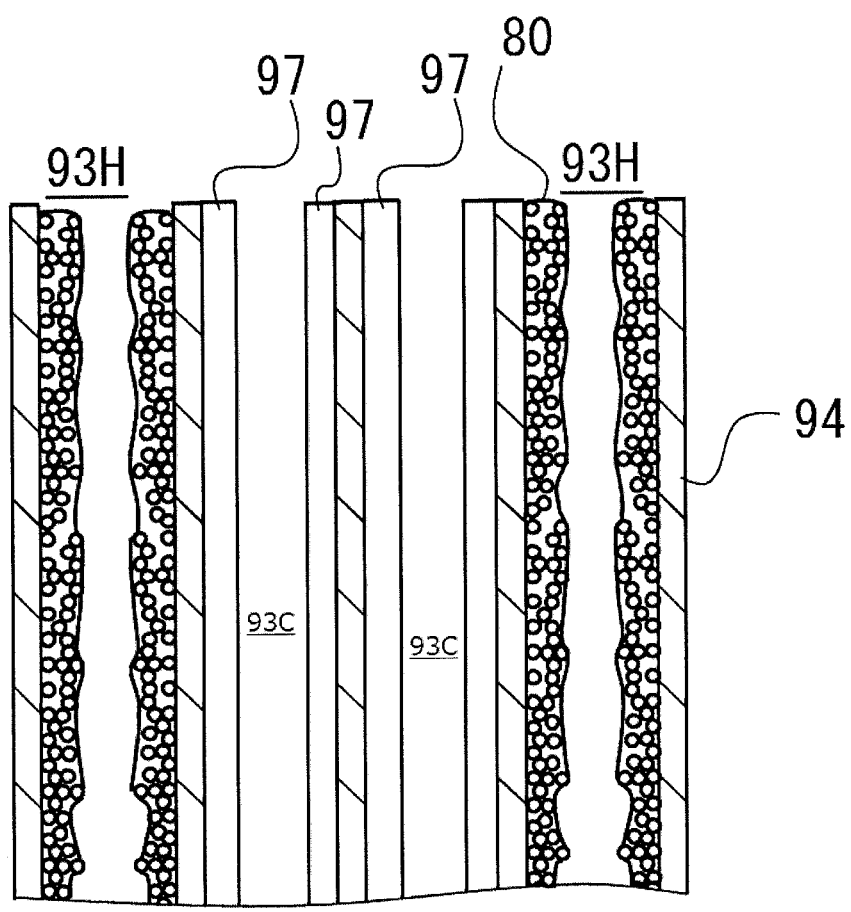

[Fig. 10]
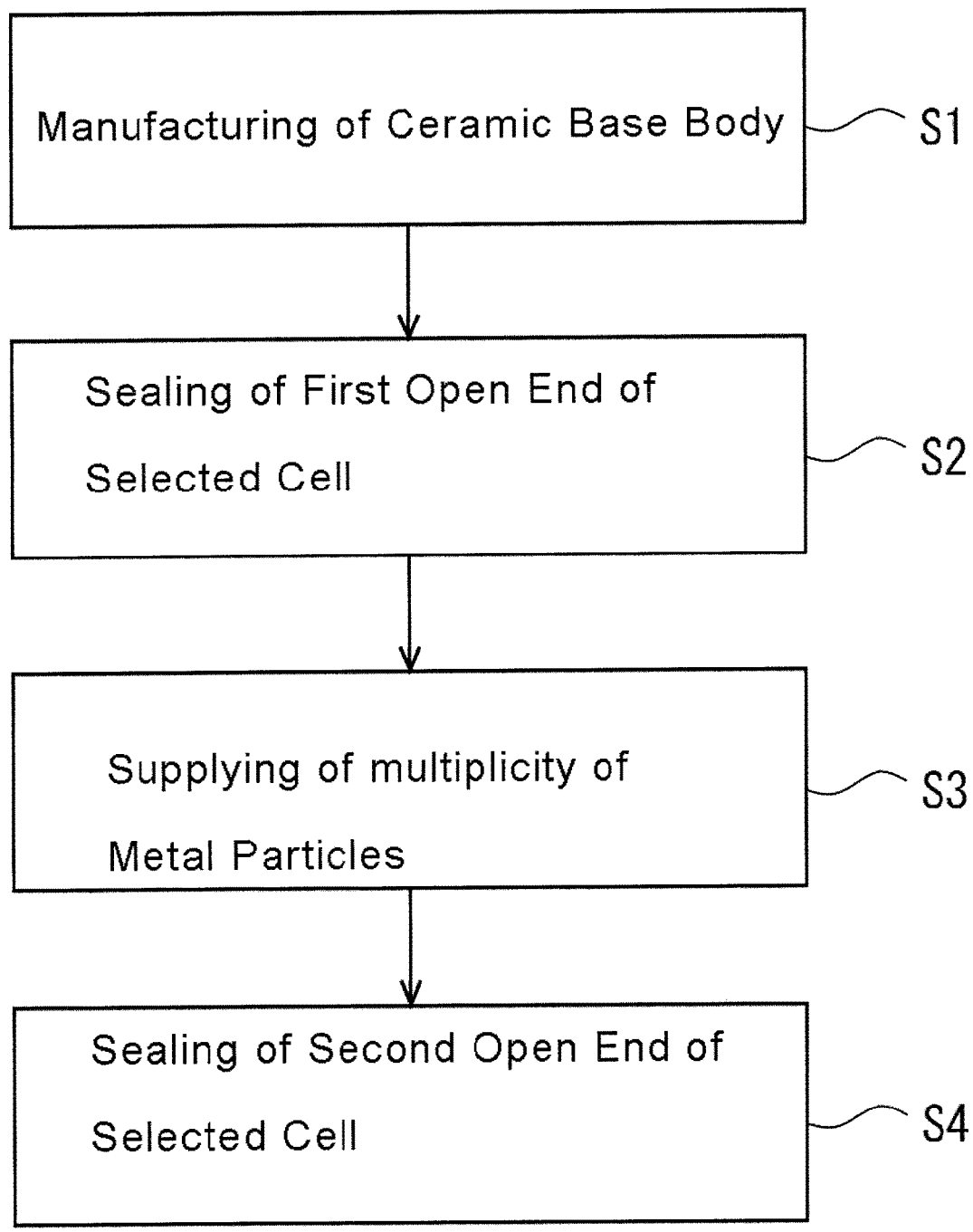

[Fig. 11]
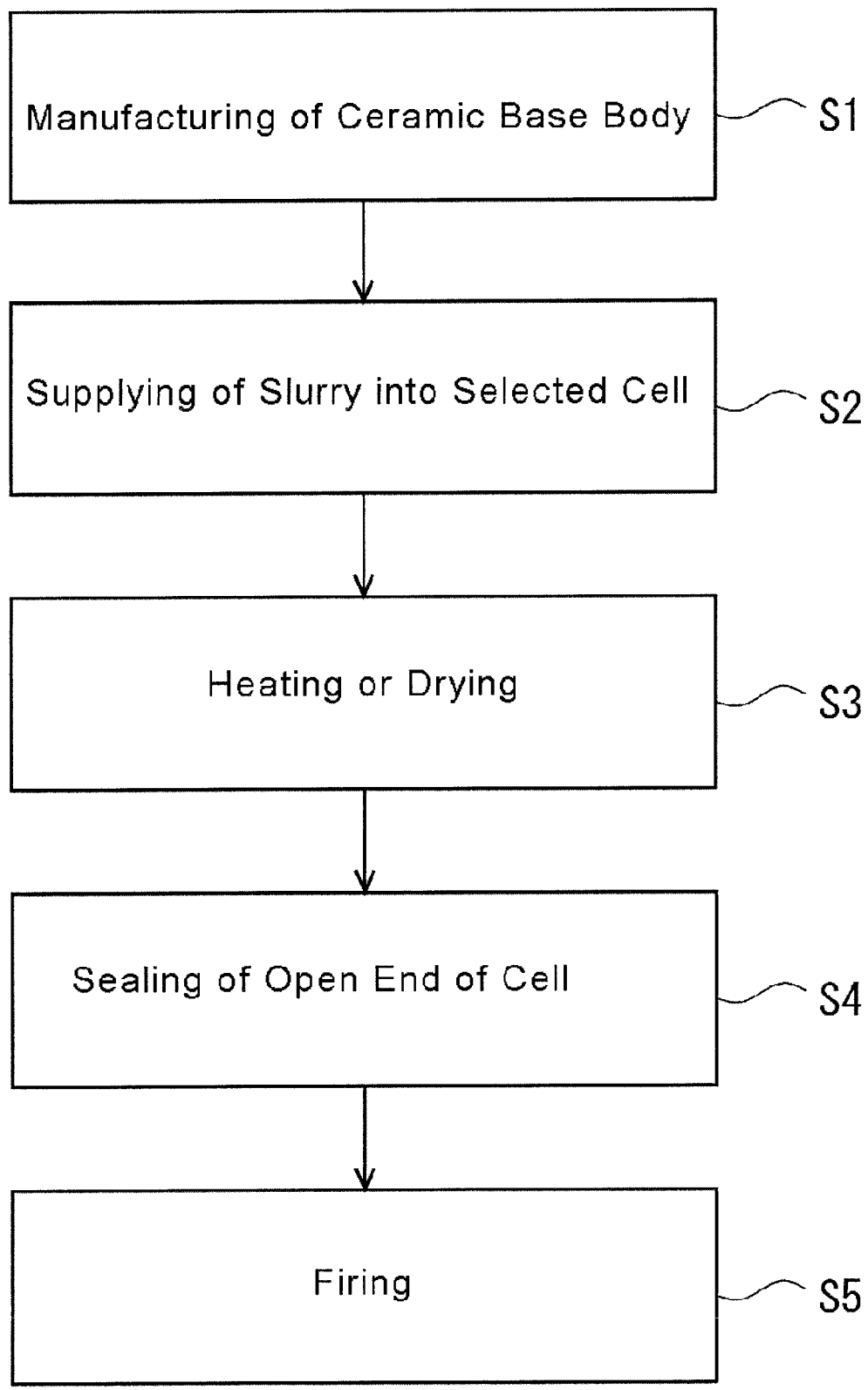

[Fig. 12]
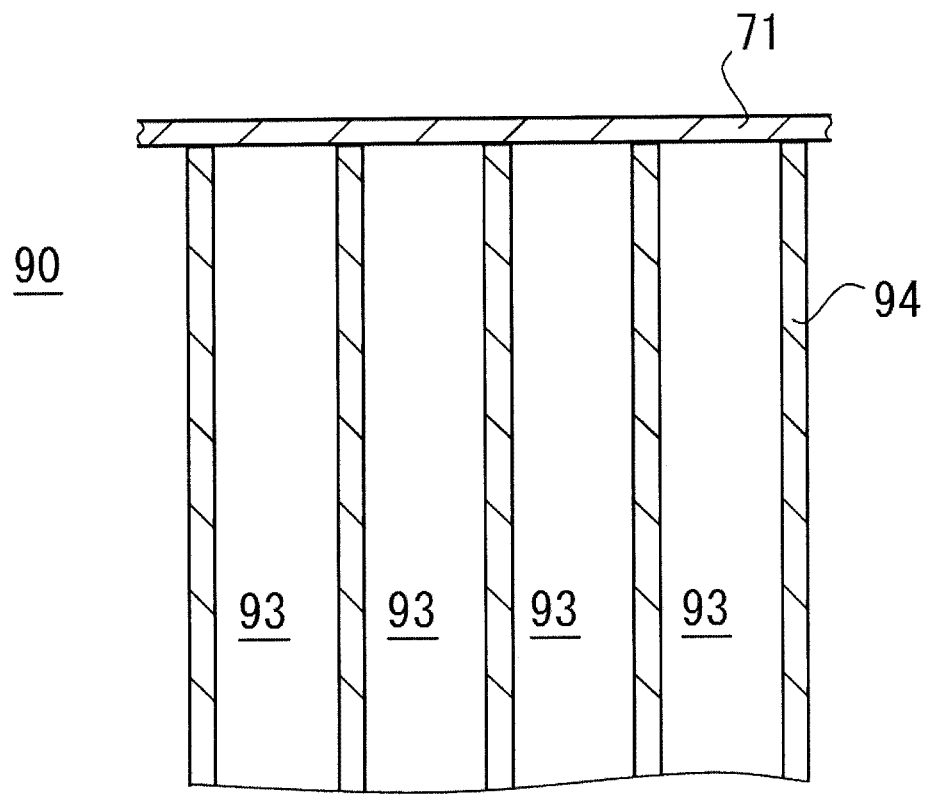
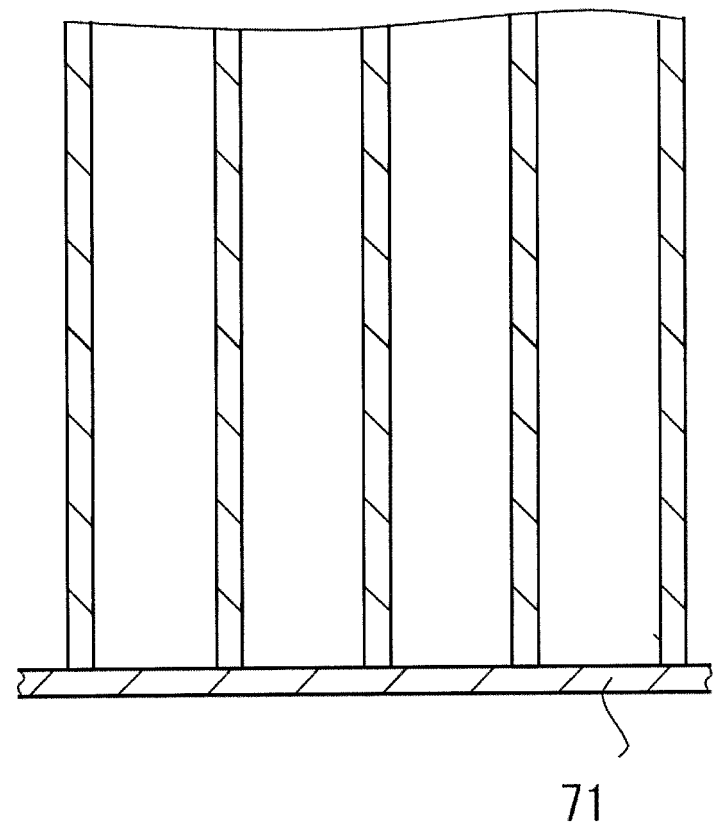

[Fig. 13]
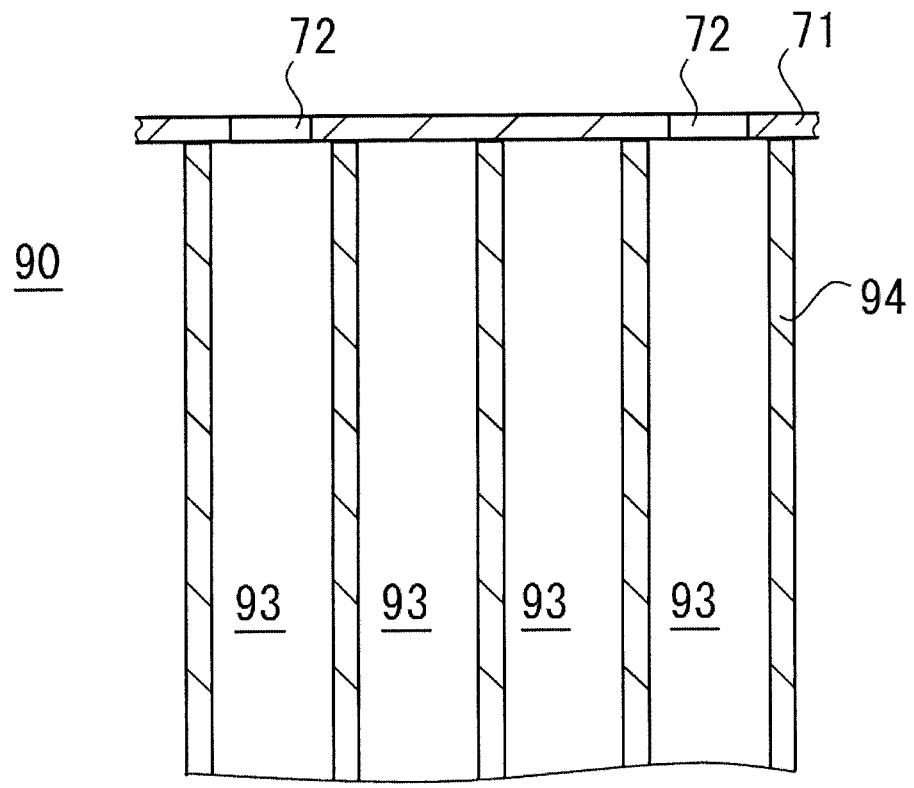
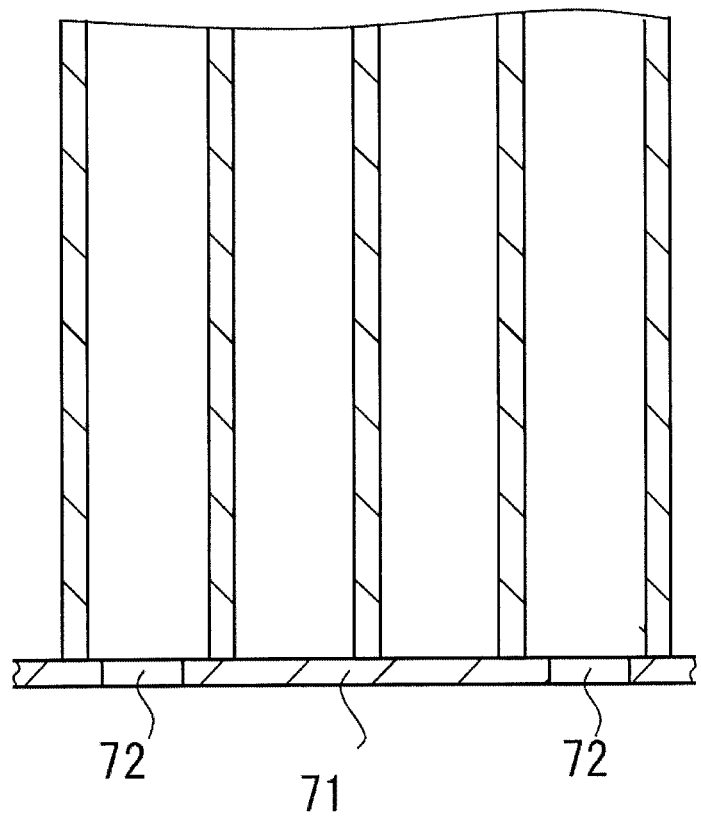

[Fig. 14]
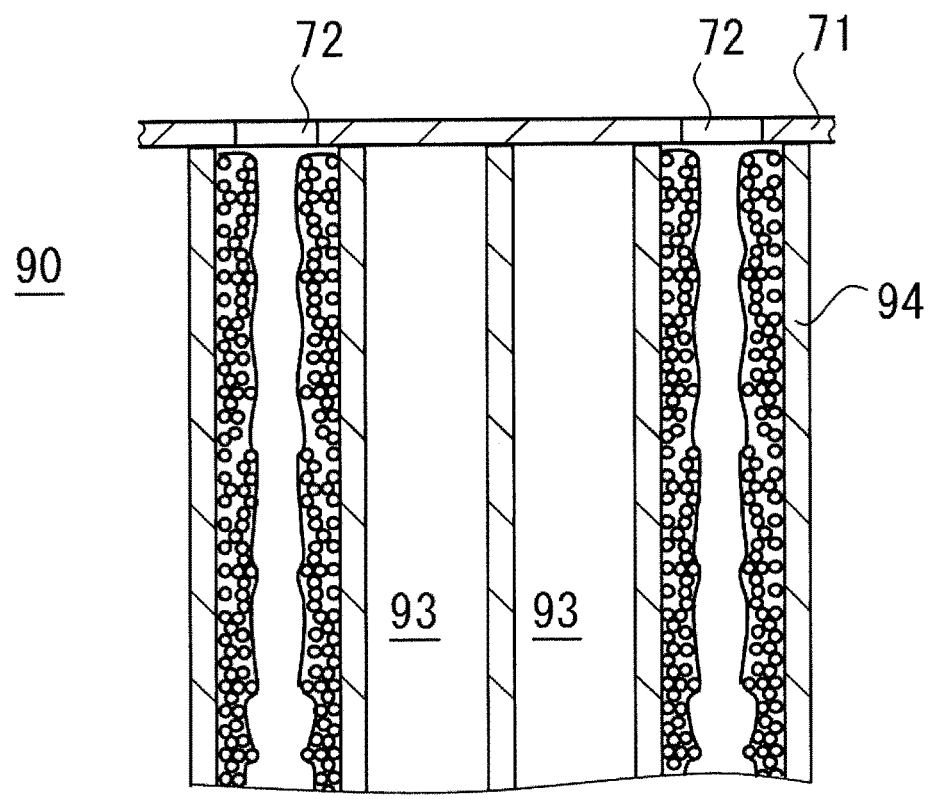
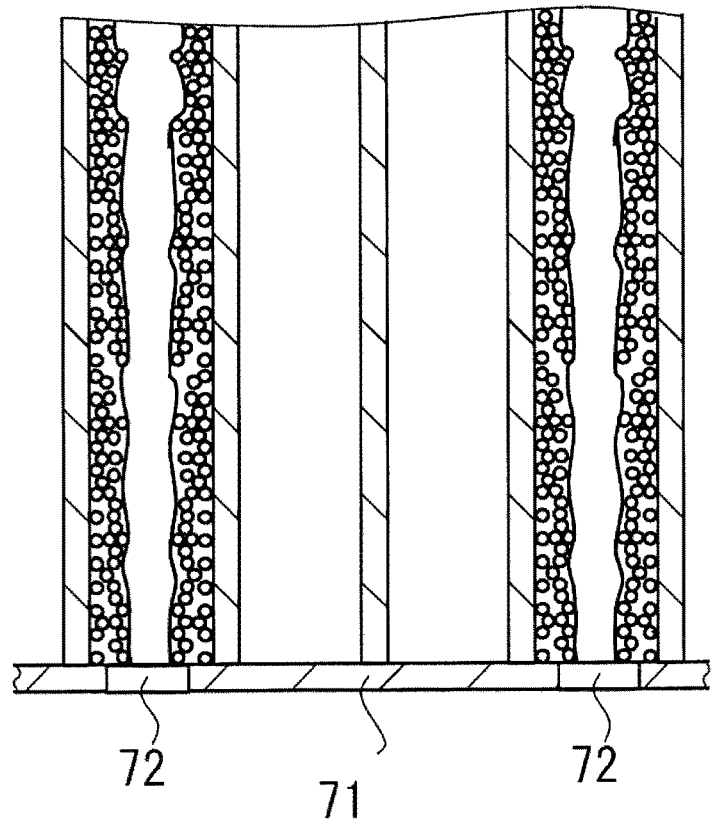

[Fig. 15]
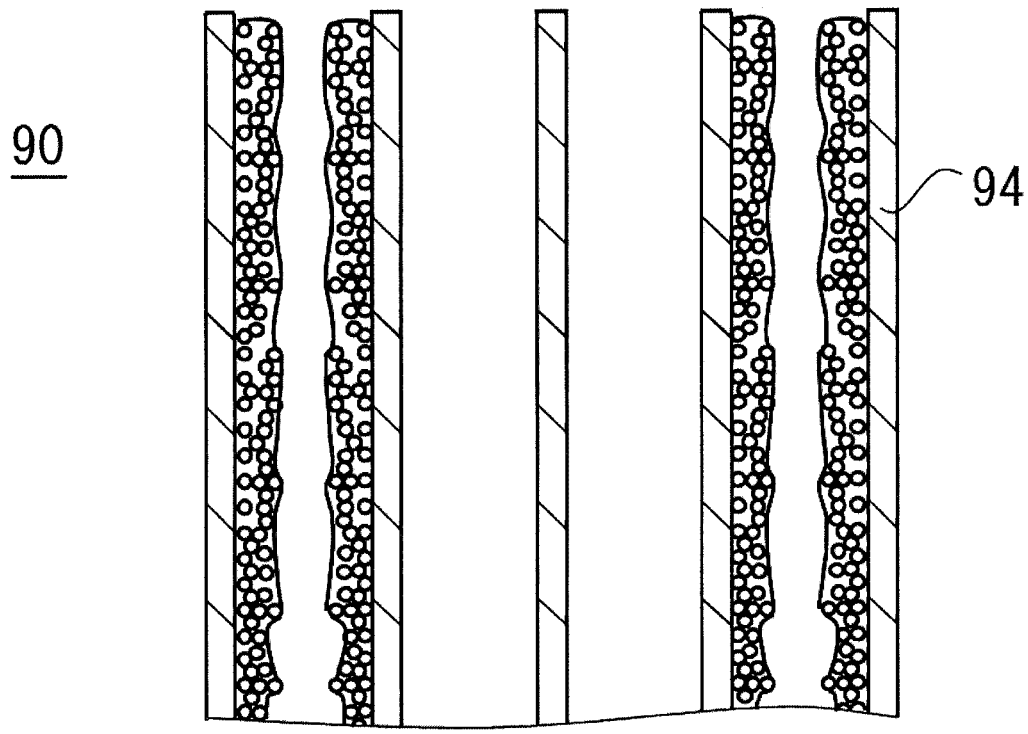
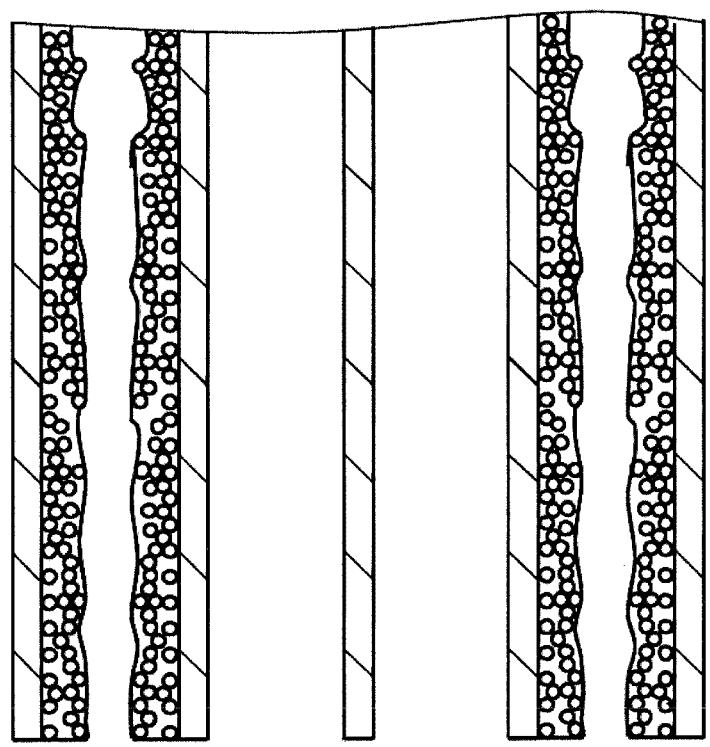

[Fig. 16]
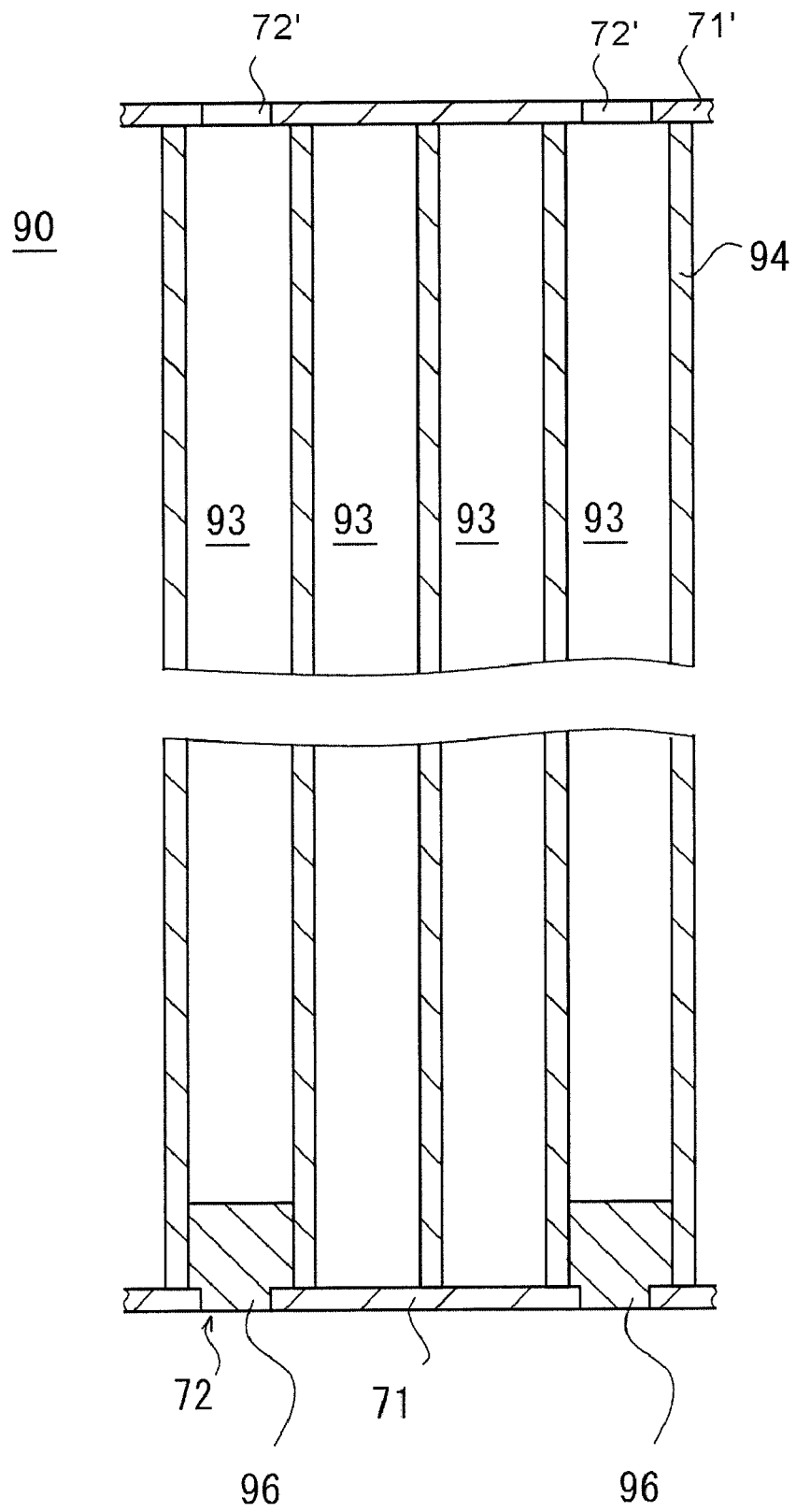

[Fig. 17]
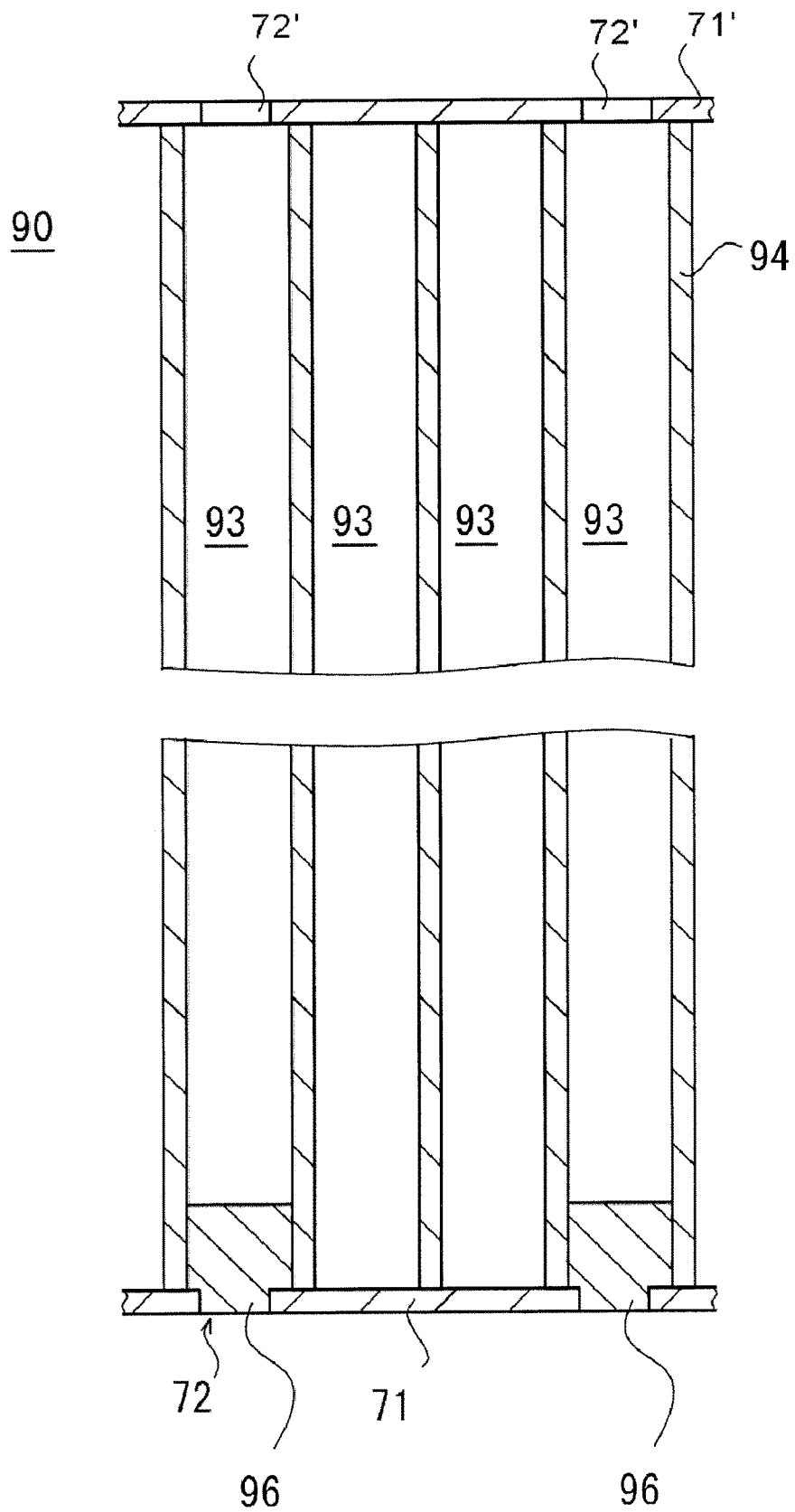

[Fig. 18]
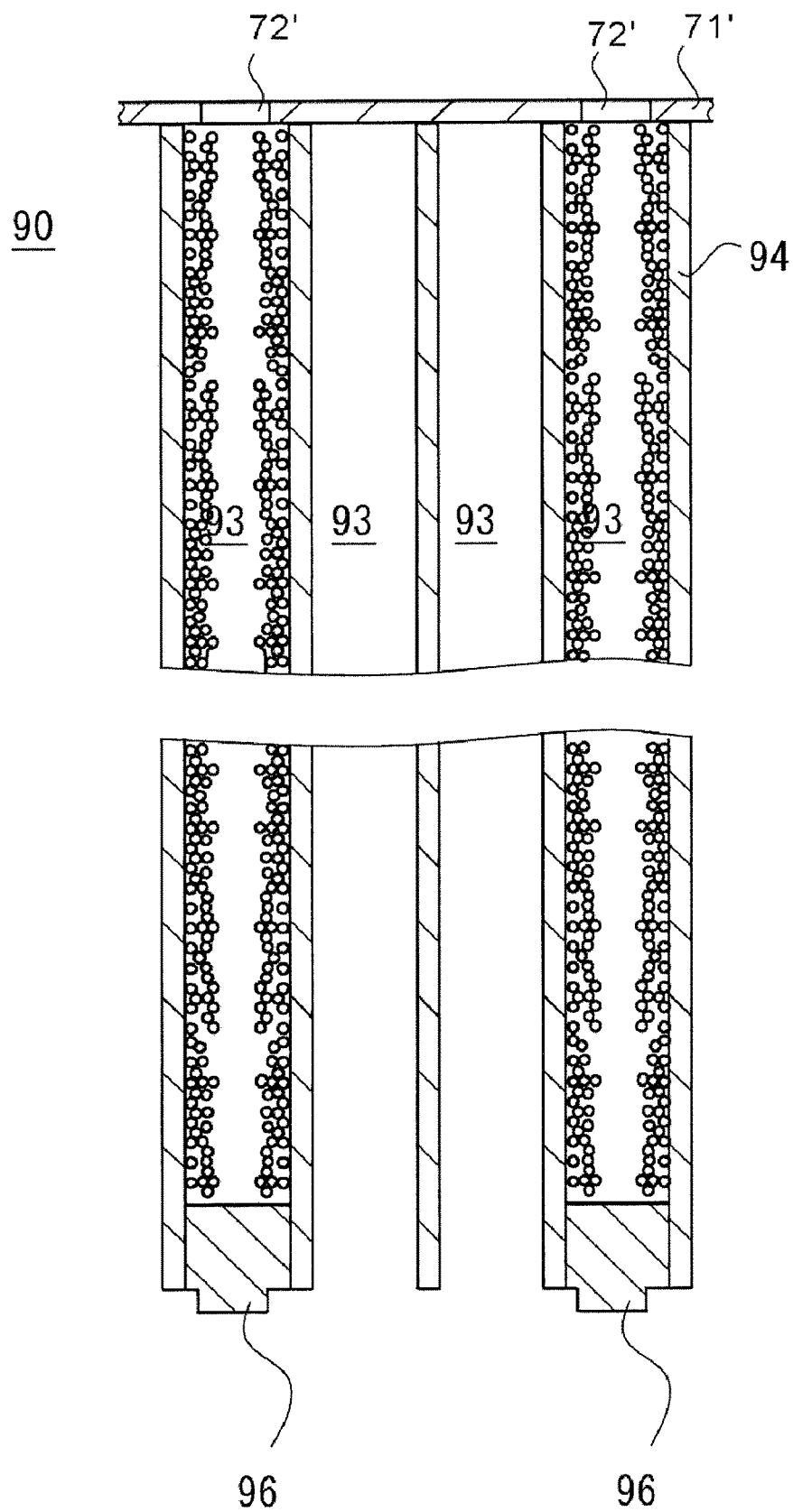

CATALYST SUBSTRATE, METHOD OF MANUFACTURING THE SAME, AND EXHAUST GAS PURIFICATION APPARATUS

CROSS-REFERENCE TO RELATED APPLICATION

The present application claims a priority of Japanese Patent Application No. 2018-80108, filed on Apr. 18, 2018 and entitled "Catalyst Substrate, Method of manufacturing the same, and Exhaust Gas Purification Apparatus", the entire content of which is hereby incorporated by reference.

TECHNICAL FIELD

The present disclosure is directed to a catalyst substrate, a method of manufacturing the same, and an exhaust gas purification apparatus.

BACKGROUND

US Patent Application Publication No. 2017/0022868 Specification discloses a technique in which metal wires are inserted into selected cells in a substrate and the substrate is heated based on induction heating.

SUMMARY

When the metal wires are inserted into the selected cells in the substrate, one may consider that a diameter of metal wire should be increased in order to reduce an influence of shaking when the substrate is built into a moving body such as a two-wheeled vehicle or four-wheeled vehicle. However, it would be not easy to suitably insert, into the selected cells, such metal wires with increased diameter.

A catalyst substrate according to an aspect of the present disclosure may include: a ceramic base body including first and second ends, the second end being opposite to the first end, and the ceramic base body being provided with a plurality of cells each extending between the first and second ends; and a plurality of metal particles or metal fragments introduced into one or more internal spaces of one or more selected cells in the plurality of cells, wherein each of the plurality of metal particles or metal fragments has a size equal to or less than an opening width of the cell, and the plurality of metal particles or metal fragments is configured to generate heat in accordance with varying magnetic field.

In some embodiments, the first end and/or the second end is provided with a plurality of sealing portions, each of the plurality of sealing portions being configured to seal an open end of the selected cell. The plurality of metal particles or metal fragments may be included in a multiplicity of metal particles or metal fragments that at least partially occupies the internal space of the cell.

In some embodiments, the sealing portion may be configured to prevent a catalyst from flowing into the selected cell. The catalyst substrate may consist of cordierite, and the plurality of sealing portions may consist of cordierite. The selected cell may be occupied by the plurality of metal particles or metal fragments entirely between the first and second ends. The plurality of metal particles or metal fragments may be bonded to one another and to the ceramic base body via a bonding material in the internal space of the cell. A coating layer, where the metal particles or metal fragments are dispersed, is formed on an inner surface of a cell-wall of the selected cell.

In some embodiments, the first end and/or the second end may be provided with one or more sealing portions, the sealing portion being configured to seal an open end of the selected cell. The sealing portion may include at least ceramic material.

In some embodiments, a hollow may exist in at least one selected cell, in which the coating layer has been formed, in a cross-sectional plane orthogonal to an extending direction of the ceramic base body between the first and second ends, and a ratio of an area of the hollow to an area of the cell in the cross-sectional plane is equal to or greater than 20%. A ratio of an area of the hollow to an area of the cell in the cross-sectional plane may be equal to or greater than 50%.

In some embodiments, the plurality of metal particles or metal fragments may include metal particles or metal fragments of ferritic stainless steel or austenitic stainless steel.

In some embodiments, the metal particles or metal fragments each may have an average particle size equal to or less than 100 μm.

In some embodiments, thermal expansion coefficient of ceramic material of the ceramic base body may be equal to or less than $2\times10^{-6}$/K.

In some embodiments, initial permeability of metal material of the metal particle or metal fragment may be equal to or greater than $5\times10^{-5}$ H/m.

In some embodiments, the ceramic base body may include ceramic oxide material.

In some embodiments, a thickness of the cell-wall may be equal to or less than 0.2 mm.

An exhaust gas purification apparatus according to an aspect of the present disclosure may include: an exhaust gas purification device that comprises a catalyst substrate supporting a catalyst; and a coil wiring that spirally surrounds the exhaust gas purification device, the catalyst substrate comprising: a ceramic base body including first and second ends, the second end being opposite to the first end, and the ceramic base body being provided with a plurality of cells each extending between the first and second ends; and a plurality of metal particles or metal fragments introduced into one or more internal spaces of one or more selected cells in the plurality of cells of the ceramic base body, each of the metal particles or metal fragments having a size equal to or less than an opening width of the cell and generating heat in accordance with varying magnetic field, and the catalyst being introduced into one or more cells other than the selected cells.

A method of manufacturing a catalyst substrate according to an aspect of the present disclosure may include:

preparing a ceramic base body including first and second ends, the second end being opposite to the first end, and the ceramic base body being provided with a plurality of cells each extending between the first and second ends; and introducing a plurality of metal particles or metal fragments into one or more internal spaces of one or more selected cells in the plurality of cells of the ceramic base body, wherein each of the plurality of metal particles or metal fragments has a size equal to or less than an opening width of the cell, and the plurality of metal particles or metal fragments is configured to generate heat in accordance with varying magnetic field.

In some embodiments, the method may further includes forming a plurality of sealing portions at the first end and/or the second end, each of the plurality of sealing portions being configured to seal an open end of the selected cell. Slurry including at least the plurality of metal particles or metal fragments, powder of bonding material, and dispersion medium may be introduced into the respective selected cells. When the slurry is introduced into the selected cell, the dispersion medium of the slurry may flow into one or more adjacent cells at least through a cell-wall of selected cell such that a solid content accumulates inside the selected cell.

In some embodiments, said forming a plurality of sealing portions at the first end and/or the second end may include:

introducing a clay into the selected cell through an aperture formed in a cover placed on a terminal surface of the ceramic base body; and drying the ceramic base body.

In some embodiments, first and second covers may be placed onto respective terminal surfaces at the first and second ends, the slurry may be introduced into the selected cell through an aperture formed in the first cover, and the introducing of the slurry may end when the slurry flows out of the selected cell via an aperture formed in the second cover.

In some embodiments, the internal space of the cell may be filled with powder at least including a multiplicity of metal particles or metal fragments.

In some embodiments, the method may further include: sealing, by a sealing material, an open end of the cell into which the multiplicity of metal particles or metal fragments will be introduced. The sealing material may include at least ceramic material.

In some embodiments, said forming a plurality of sealing portions at the first end and/or the second end may include:

introducing a clay into the selected cell through an aperture formed in a cover placed on a terminal surface of the ceramic base body; and drying the ceramic base body.

In some embodiments, the method of manufacturing a catalyst substrate may further include:

covering, by a cover, first or second terminal surface at the first or second end of the ceramic base body, the cover having an aperture that allows slurry to flow into the cell. The supplying of the slurry may end when the slurry flows out of the selected cell via a second aperture formed in a second cover arranged at the opposite side.

In some embodiments, the method of manufacturing a catalyst substrate may further include drying the ceramic base body in which the slurry has been introduced into the internal space of the selected cell so that a solid content of the slurry is bonded to the cell-wall extending around the cell.

In some embodiments, the method of manufacturing a catalyst substrate may further include thermally processing the ceramic base body in a non-oxidizing atmosphere after the slurry has been dried.

According to an aspect of the present disclosure, an alternative solution to the metal wires would be provided.

BRIEF DESCRIPTION OF DRAWINGS

Hereinafter, non-limiting exemplary embodiments of the present invention will be described with references to FIGS. 1 to 18 where like numerals represent like elements. A skilled person would be able to combine the respective embodiments and/or respective features without requiring excess descriptions. A skilled person would also be able to understand synergic effect by such combinations. Overlapping descriptions among exemplary embodiments will be basically omitted. Referenced drawings are mainly for the purpose of illustrating an invention and may possibly be simplified for the sake of convenience of illustration. The respective features identified by the language of "In some instances" in the present specification would be understood as an universal feature that is effective not only to a catalyst substrate and/or a method of manufacturing a catalyst substrate disclosed in the drawings for example, but also effective to other various catalyst substrates and/or methods of manufacturing a catalyst substrate.

FIG. 1 is a schematic view of a channel for exhaust gas into which an exhaust gas purification apparatus according to an aspect of the present disclosure has been arranged.

FIG. 2 is a schematic perspective view of a ceramic base body according to an aspect of the present disclosure, schematically illustrating a portion of cells within a dashed circle which are opened at a first end of the ceramic base body.

FIG. 3 is an elevational schematic view of a first end of a ceramic base body of a catalyst substrate according to an aspect of the present disclosure in which selected cells are labelled with hatching.

FIG. 4 is a schematic cross-sectional view taken along a line IV-IV in FIG. 3.

FIG. 5 is a schematic cross-sectional view taken along a line V-V in FIG. 4.

FIG. 6 is a schematic view showing a state in which catalyst has been introduced into cells of the ceramic base body illustrated in FIG. 4.

FIG. 7 is a schematic cross-sectional view of a catalyst substrate according to another embodiment, corresponding to a section along a line IV-IV in FIG. 3.

FIG. 8 is a schematic cross-sectional view taken along a line VIII-VIII in FIG. 7.

FIG. 9 is a schematic view showing a state in which catalyst has been introduced into cells.

FIG. 10 is a schematic flowchart showing a method of manufacturing a catalyst substrate.

FIG. 11 is a schematic flowchart showing a method of manufacturing a catalyst substrate.

FIG. 12 is a schematic view showing a state in which covers have been placed on respective terminal surfaces of a ceramic base body.

FIG. 13 is a schematic view showing a state in which apertures have been selectively formed in the covers placed on the terminal ends of the ceramic base body.

FIG. 14 is a schematic view showing a state in which a slurry is introduced into selected cells in the ceramic base body via apertures formed in the cover.

FIG. 15 is a schematic view showing a state in which bonding material has been introduced into cells in the ceramic base body.

FIG. 16 is a schematic view showing that clay is introduced into cells via apertures formed in a cover so that sealing portions are formed.

FIG. 17 is a schematic view showing a state in which a cover has been removed.

FIG. 18 is a schematic view showing a state in which slurry is introduced into selected cells via open ends of selected cells and its solid content is accumulated selectively within the selected cells.

DETAILED DESCRIPTION

FIG. 1 is a schematic view of a channel for exhaust gas into which an exhaust gas purification apparatus has been arranged. A channel for exhaust gas is defined by a metal pipe 2. An exhaust gas purification apparatus 6 is provided at a radially-enlarged tube portion 2a of the metal pipe 2. The exhaust gas purification apparatus 6 has an exhaust gas purification device 3 in which a catalyst substrate supports a catalyst; a coil wiring 4 that helically extends around the outer circumference of the exhaust gas purification device 3; and a securing member 5 that is used for securing the exhaust gas purification device 3 and the coil wiring 4 inside of the metal pipe 2. A catalyst supported by the catalyst substrate of the exhaust gas purification device 3 may be a noble metal-based catalyst or any other types of catalysts, for example. The noble metal based catalysts may include a ternary catalyst or oxidized catalyst, which supports a noble metal such as platinum (Pt), palladium (Pd), and rhodium (Rh) by a surface of fine pore of alumina and includes ceria, zirconia and so on as a promoter, or a NOx occlusion reduction catalyst which includes alkaline earth metal and platinum as occlusive components of nitrogen oxide (NOx). A catalyst not using a noble metal may include a NOx selective reduction catalyst that includes a copper-substituted or iron-substituted zeolite and so on, for example.

In the present specification, "a catalyst substrate included in an exhaust gas purification device" will indicate that the catalyst substrate is actually supporting a catalyst. However, in the present specification, "a catalyst substrate" alone will indicate a catalyst substrate that is not supporting a catalyst yet unless it is expressly stated that "the catalyst substrate" is supporting a catalyst. As described below, a catalyst may be introduced into one or more cells 93 of a ceramic base body 90 other than cells 93 into which metal particles or metal fragments 82 have been introduced.

The coil wiring 4 is helically wound around the outer circumference of the exhaust gas purification device 3. Envisaged are embodiments where two or more coil wirings 4 are used. In accordance with turning-ON of a switch SW, an alternating current supplied from an AC power source CS flows in the coil wiring 4. A periodically changing magnetic field is in turn generated around the coil wiring 4. Note that the ON/OFF of the switch SW may be controlled by a controller 1. The controller 1 is capable of turning ON the switch SW in synchronization with starting of an engine and is capable of allowing an alternating current to flow in the coil wiring 4. Note that, an embodiment is envisaged where the controller 1 turns ON the switch SW independently of starting of an engine (for example, in accordance with activation of a heating switch pushed by a driver). The securing member 5 may be a refractory member and may be provided to secure inside of the metal pipe 2 the exhaust gas purification device 3, supporting a catalyst, and the coil wiring 4.

It has been considered that, when an engine starts, a temperature of exhaust gas reaching the exhaust gas purification device 3 will likely be not sufficiently high. In this case, it is concerned that chemical reaction expected to be promoted by a catalyst supported by the catalyst substrate of the exhaust gas purification device 3 does not progress well, and harmful components in the exhaust gas, i.e. carbon monoxide (CO), nitrogen oxide (NOx), and hydrocarbon (CH) may pass through the exhaust gas purification device 3 as it is. In the present disclosure, the temperature of the exhaust gas purification device 3 will be increased in accordance with the changing magnetic field that is caused in accordance with the alternating current flowing the coil wiring 4. This increase in the temperature of the exhaust gas purification device 3 will increase the temperature of the catalyst supported by the catalyst substrate included in the exhaust gas purification device 3, thus the catalyst reaction being facilitated. In particular, carbon monoxide (CO), nitrogen oxide (NOx), and hydrocarbon (CH) may be oxidized or reduced to be carbon dioxide ($CO_2$), nitrogen ($N_2$), and water ($H_2O$).

The catalyst substrate that is expected to support a catalyst has a ceramic base body 90 (See FIGS. 2 and 3), and a plurality of metal particles or metal fragments 82 (See FIGS. 4 to 9) that is introduced into one or more internal spaces of one or more cells 93 selected in a plurality of cells 93 of the ceramic base body 90.

The ceramic base body 90 has a first end 91 and a second end 92 opposite to the first end 91. In particular, the ceramic base body 90 is a columnar article having a first end 91 and a second end 92 opposite to the first end 91. The ceramic base body 90 could take various shapes such as a cylinder or a prism. The ceramic base body 90 is provided with the plurality of cells 93 each extending between the first end 91 and the second end 92. Each cell 93 is defined by a cell-wall 94 and has a first open end at the first end 91 side and a second open end at the second end 92 side. A fluid can communicate between the first end 91 and the second end 92 via the cell 93. The cell 93 Could take various opening shapes. For example, its opening shape can be triangle, rectangle, pentagon, hexagon, octagon, circle, ellipse or any combination thereof.

One of the first end 91 and the second end 92 is arranged at an upstream side in the channel for exhaust gas, and the other one of the first end 91 and the second end 92 is arranged at a downstream side in the channel for exhaust gas. Thus, it can be alternatively referred to as an upstream or downstream end. Note that, the ceramic base body 90 is provided with an outer circumferential wall 95 that is thicker than the cell-wall 94.

The ceramic base body 90 may be a non-conductive porous body, for example. The ceramic base body 90 may include an oxide-based ceramic material. The oxide-based ceramic material may be one or more material selected from a group consisting of alumina ($Al_2O_3$), zirconia ($ZrO_2$), magnesia (MgO), titania ($TiO_2$), silica ($SiO_2$), and aluminum titanate. In a case, the ceramic base body 90 includes cordierite ($2MgO.2Al_2O_3.5SiO_2$) or is made of cordierite ($2MgO.2Al_2O_3.5SiO_2$).

A method of manufacturing a ceramic base body 90 that is made of cordierite ($2MgO.2Al_2O_3.5SiO_2$) is well established in the art. Firstly, a clay is molded through extrusion, and a soft molded body obtained by the extrusion molding is dried and fired. The clay may include at least a raw material that will be cordierite ($2MgO.2Al_2O_3.5SiO_2$) by firing, an organic binder, and dispersion medium (carrier fluid). In a step of firing, the binder included in the clay will be removed, and porous ceramic base body 90 will be obtained.

The raw material that will be cordierite ($2MgO.2Al_2O_3.5SiO_2$) by firing may be referred to as a raw material for cordierite. The raw material for cordierite may have a chemical composition in which silica is within 40 to 60 mass %, alumina is 15 to 45 mass %, and magnesia is within 5 to 30 mass %. The raw material for cordierite may be a mixture of a plurality of inorganic material selected from a group consisting of talc, kaolin, calcined kaolin, alumina, aluminum hydroxide, and silica. The organic binder may include at least one material selected from a group consisting of agar, hydroxypropyl methylcellulose, methylcellulose, hydroxyl ethylcellulose, carboxy methylcellulose, and polyvinyl alcohol. The firing temperature may be set within 1380 to 1450° C. or 1400 to 1440° C. The firing time period may be within 3 to 10 hours.

If required, a pore-forming agent may be added to the clay. The pore-forming agent may be any material that will disappear during a step of firing, and may include, for example, inorganic material such as coke, a highly polymerized compound such as foamed plastic (foamed resin), organic material such as a starch or any combination thereof. The dispersion medium may include ethylene glycol, dextrin, fatty acid soap, polyalcohol or any combination thereof, additionally or alternative to water.

In the present embodiment, the metal particles or metal fragments 82 are introduced into one or more internal spaces of one or more cells 93 selected in the plurality of cells 93 of the ceramic base body 90. Each metal particle or metal fragment 82 has a size equal to or less than an opening width W93 of the cell 93, and generates heat in accordance with varying magnetic field. An introducing ratio or introducing manner of metal particles or metal fragments 82 will be preferably determined so as to reduce an influence of shaking when the catalyst substrate is built into a moving body such as a two-wheeled vehicle or four-wheeled vehicle, or so as to enhance efficiency of manufacturing of a catalyst substrate. The opening width W93 of the cell 93 may be equal to a minimum width of the cell 93 in a cross-sectional plane that is orthogonal to an extending direction of the ceramic base body 90 between the first end 91 and the second end 92.

The plurality of metal particles or metal fragments 82 having been introduced into one or more internal spaces of one or more cells 93 selected in the plurality of cells 93 of the ceramic base body 90 is used for induction heating and not used for catalyst reaction. Hereinafter, these one or more cells 93 into which metal particles or metal fragments 82 have been introduced for induction heating will be referred to as "heating cell(s)". Cells 93 other than the "heating cells" are cells into which a catalyst will be introduced in future, and will be referred to as "catalyst cell(s)".

The metal particles or metal fragments 82 for induction heating which are introduced into the selected cells 93 of the ceramic base body 90 may include metal particles or metal fragments 82 of stainless steel such as metal particles or metal fragments 82 of ferritic stainless steel. Additionally or alternatively, the metal particles or metal fragments 82 for induction heating may include martensitic stainless steel, austenitic stainless steel, invar or super invar. The metal particles or metal fragments 82 for induction heating may present a magnetic property. In some instances, initial permeability of metal material of metal particles or metal fragments 82 is equal to or greater than $5 \times 10^{-5}$ H/m.

The ceramic base body 90 has M (M is an integer equal to or greater than 2) catalyst cells 93C and N (N is an integer equal to or greater than 2, and is less than M) heating cells 93H (See FIG. 3). The number of heating cells 93H is less than the number of catalyst cells 93C. In this case, an ability of the exhaust gas purification apparatus 6 for purifying the exhaust gas would be prevented from being lowered together with the introduction of the heating cells 93H.

The heating cells 93H are regularly arranged in the two dimensional array of cells 93 (See FIG. 3). In some instances, the heating cells 93H are arranged at intervals of Q (Q is an integer equal to or greater than 2) rows and P (P is an integer equal to or greater than 2) columns in the two-dimensional dimensional array of cells 93. In a case illustrated in FIG. 3, the heating cells 93H are regularly arranged at intervals of 2 rows and 2 columns. In a case as such where one heating cell 93H is surrounded by plural catalyst cells 93C, the plural catalyst cells 93C can receive heat transmitted from the common heating cell 93H, and thus a deviation may not be caused in a temperature distribution in the ceramic base body 90. In some instances, the heating cells 93H are arranged at intervals of 5 cells, but not necessarily limited to this though.

Alternating current of 30 Hz or greater, 100 Hz or greater, or 200 Hz or greater may flow in the coil wiring 4. When the alternating current flows in the coil wiring 4, eddy current will flow in each of the metal particles or metal fragments 82 introduced into the cell 93 of the ceramic base body 90, and in turn joule heat will be generated. In accordance with increase in frequency of alternating current flowing in the coil wiring 4, more current will likely flow nearby a surface of metal particle or metal fragment 82, and more heat will be generated nearby the surface of metal particle or metal fragment 82. This is a result of "Skin Effect". That is, compared with a case of metal wires, metal particles or metal fragments 82 would allow that greater heat will be obtained by lesser amount of metals (in other words, lesser amount of increased weight). The metal particle or metal fragment 82 may have an average particle size equal to or less than 100 μm, 80 μm, 60 μm, 50 μm, 40 μm, 30 μm, or 20 μm, not necessarily limited to this though.

As illustrated in FIG. 4, the metal particles 82 introduced into the cell 93 are included in a multiplicity of metal particles which at least partially occupies the internal space of the cell 93. In other words, the ceramic base body 90 has a plurality of cells 93 (i.e. heating cells 93H) at least partially occupied by a multiplicity of metal particles. The multiplicity of metal particles is introduced into the cells 93 selected in the two-dimensional array of cells 93 in the ceramic base body 90. Note that, in a case in which a diameter of each metal particle in the multiplicity of metal particles is small, it would be understood that a powder made of the multiplicity of metal particles is introduced into the cell 93.

In order to block a catalyst from entering at the time of coating of catalyst, a sealing portion 96 that seals an open end of the cell 93 may be provided at one or both of the first end 91 and the second end 92 of the ceramic base body 90. Even when a catalyst was introduced into a heating cell 93H, the catalyst might be deteriorated due to heating by the metal particles. Thus, it would be not appropriate to expect that functionality of catalyst will be sustained over a long period of time. By using the sealing portion 96, this loss of catalyst may be suppressed or avoided. The sealing portion 96 may also prevent the metal particles inside of the heating cell 93H from being oxidized and deteriorated due to contact between the metal particle inside of the heating cell 93H and an exhaust gas.

The sealing portion 96 can include at least ceramic material. The sealing portion 96 can include other material such as glass additionally to the ceramic material. For example, the ceramic base body 90 and the sealing portion 96 include cordierite ($2MgO.2Al_2O_3.5SiO_2$). Combination of cordierite-made ceramic base body 90 and cordierite-made sealing portion 96 would reduce a difference in thermal expansion that may otherwise be caused between them. That is, in some instances, the ceramic base body 90 and the sealing portion 96 include identical ceramic material. Note that, the sealing portion 96 can be a porous body likewise the ceramic base body 90.

The sealing portion 96 may be obtained by sealing an open end of selected cell 93 of the ceramic base body 90 using a sealing material, and then calcining the ceramic base body 90 at a temperature equal to or less than 950° C., not necessarily limited to this though. That is, the sealing material is bonded to the ceramic base body 90 through a step of calcination so that the sealing portion 96 is formed. The sealing material may include at least ceramic material in some instances. For example, the sealing material is made of a mixture including cordierite particles and colloidal silica, and the sealing material will be bonded to the ceramic base body 90 by the colloidal silica through calcination, but not necessarily limited to this though.

The metal particles or metal fragments are introduced into the cell 93 of the ceramic base body 90 via an open end of the cell 93. An embodiment is envisaged in which bonding material (e.g. glass powder (glass particles)) is additionally introduced into the cell 93 of the ceramic base body 90 via the open end of the cell 93. After the metal particles or metal fragments have been introduced into the cell 93, the bonding material would be melted by heating the ceramic base body 90. As a result, bonding of metal particles via the bonding material inside of the cell 93 is caused, and also bonding of metal particle with the ceramic base body 90 is caused. In a preferred embodiment, powder mixture of at least a multiplicity of metal particles and glass powder is introduced into the cell 93.

A method of introducing into the cell 93 a powder mixture including a multiplicity of metal particles or including a multiplicity of metal particles and glass powder may include a method in which the ceramic base body 90 is vibrated at several Hz to 1 k Hz and the powder is allowed to be introduced into the cell due to the gravity. As an alternative method, one open end of cell 93 is sealed by a sealing portion, and a slurry is fed into the cell 93 through the open end of the cell 93. The slurry may be a fluid in which a solid content such as metal particles and glass powder are dispersed in dispersion medium (carrier liquid) such as water. In order to ensure fluidity of the slurry, concentration of solid content in the slurry may be set to be low. Note that, it is envisaged that the slurry flows into the cell 93 based on suction. In this method, a solvent e.g. water may be discharged from an end of the ceramic base body 90 that is opposite to an end at which the slurry is introduced. Solvent component of the slurry can pass through the porous cell-wall 94, but the solid content of the slurry cannot pass through the cell-wall 94 and will be accumulated within the selected cell 93, i.e. onto the cell-wall 94 surrounding/defining the selected cell 93.

FIGS. 4 and 5 illustrate that the internal space of the cell 93 is fully occupied by metal particles, but should not be limited to this manner. A case is envisaged in which a multiplicity of metal particles can flow in the internal space of the cell 93, except bonding material was introduced into the cell 93 and metal particles or metal fragments were bonded via the bonding material, e.g. glass material. Furthermore, FIGS. 4 and 5 illustrate spherical metal particles, but the shape of metal particle should not be limited to a sphere. It is envisaged that metal fragments are used additionally to or alternative to metal particles. The metal fragments could have any shape in so far as it has a size equal to or less than the opening width W93 of the cell 93. An embodiment is envisaged in which different size and shapes of metal particles or fragments are introduced into a common selected cell 93.

FIG. 6 is a schematic view showing a state in which a catalyst layer 97 has been introduced into the catalyst cells 93C of the ceramic base body 90 illustrated in FIG. 4. Wash-coating method has been known as a way to introduce a catalyst into the ceramic base body 90. In wash-coating method, a slurry including catalyst is supplied into the cells of the catalyst substrate. Note that, supplying a slurry into the cells of the catalyst substrate could be performed by immersing a catalyst substrate into a solution of slurry. Solvent component of the slurry will be absorbed by the porous cell-wall 94, thus facilitating settlement of the catalyst layer 97 onto the cell-wall 94. It should be noted that other methods than the wash-coating method such as injection or pressure-applied pouring can be adopted.

The cell-wall 94 of the catalyst cell 93C has an inner surface for supporting a catalyst. In contrast, the cell-wall 94 of the heating cell 93H has an inner surface for confining metal particles or fragments 82 inside of the heating cell 93H. It should be noted that FIG. 6 schematically illustrates a state in which the catalyst layer 97 is coated onto the inner surface of the cell-wall 94 of the heating cell 93H. The catalyst layer 97 is introduced into the cell 93 such that the catalyst layer 97 is formed across the first end 91 and the second end 92 of the ceramic base body 90. For example, the catalyst layer 97 includes a catalyst base member and a multiple of catalyst particles attached to the catalyst base member, but should not be limited to this.

The thickness of the cell-wall 94 may be equal to or less than 0.2 mm, not necessarily limited to this though. Thinning of cell-wall 94 would reduce thermal capacity of cell-wall. Reduction of thermal capacity of the cell-wall 94 would facilitate increase in temperature of catalyst supported by the cell-wall 94 or increase in temperature of exhaust gas. As a result, harmful components in exhaust gas are suppressed to pass through the exhaust gas purification apparatus 6 as it is.

FIGS. 7 and 8 show a case in which metal particles 82 are introduced into the heating cells 93H such that the metal particles 82 are included in a coating layer 80 formed on the inner surface of the cell-wall 94 of the heating cell 93H. The ceramic base body 90 has a plurality of heating cells 93H in which a coating layer 80 including a plurality of metal particles 82 is formed on the inner surface of the cell-wall 94. The coating layer 80 is formed in the cells 93 selected in the two-dimensional array of cells 93 in the ceramic base body 90. In some instances, the coating layer 80 includes a bonding material in which a plurality of metal particles or metal fragments 82 for induction heating are dispersed. Glass may be an example of such bonding material. Glass may preferably be a high-melting point glass. The melting point of the high-melting point glass may be within a range between 900 to 1100° C. By using a high-melting point glass, heat-resistance of heating cells 93H would be improved.

The coating layer 80 may be formed by introducing a slurry into the cells 93 of the ceramic base body 90 and the drying and thermally processing the slurry, not necessarily limited to this though. The slurry used here may include a plurality of metal particles or metal fragments 82, powder of bonding material (e.g. glass), and dispersion medium (e.g. water), for example. Viscosity of slurry may be set appropriately. A temperature of drying oven used to dry the slurry may be 120° C., for example. A temperature of oven used for thermal processing of slurry may be 950° C., for example. In some instances, the temperature of thermal processing may be equal to or greater than 5 times, 6 times, or 7 times of the temperature of drying. The temperature of thermal processing may be equal to or less than 8 times of the temperature of drying.

It may be preferable that the thermal processing of slurry for forming the coating layer 80 is performed under a non-oxidizing atmosphere, i.e. an atmosphere in which oxygen does not exist for preventing the oxidization of metal particles. In a case where the thermal processing temperature is 950° C., the thermal processing can be performed at a nitrogen atmosphere, for example. In a case where the thermal processing temperature is 950° C., metal particles will be bonded due to bonding via glass powder. As a higher temperature for thermal processing, a temperature of 1100°

C. for thermal processing can be employed. In this instance, thermal processing may preferably be performed under a vacuum atmosphere. By the thermal processing at 1100° C., metal particles will be bonded one another. Accordingly, it would be possible to control a size of conductive unit, i.e. a bonded body of metal particles.

In order to block the slurry from flowing out of the cell 93, the above-described sealing portion 96 can be employed and/or a cover 71 described below can be employed. In a case where the sealing portion 96 is employed, the sealing portion 96 seals the open end of the cell 93 at one or both of the first end 91 and the second end 92 of the ceramic base body 90. The sealing portion 96 is provided to block the slurry from flowing out of the cell 93 and/or to block a catalyst from flowing into the heating cell 93H. The sealing portion 96 can include the same material as described above. Similar to the case described above, an open end of selected cell 93 of the ceramic base body 90 may be sealed by a sealing material, and the ceramic base body 90 may be fired so that the sealing portion 96 will be obtained.

FIGS. 7 and 8 show that supplying and drying of the slurry is followed by a thermal processing at 900 to 1100° C. so that solid content of the slurry is bonded to the ceramic base body, and accordingly the coating layer 80 is formed on the inner surface of the cell-wall 94 of the ceramic base body 90. In the coating layer 80, metal particles 82 are dispersed in a bonding material 81 such as glass. As would be understood from FIG. 8, a hollow 83 exists in a cell 93 in which the coating layer 80 has been formed in a cross-sectional plane that is orthogonal to an extending direction of the ceramic base body 90 between the first end 91 and the second end 92. The coating layer 80 is formed so as to form the hollow 83, thereby facilitating to reduce a thermal stress of the cell-wall 94. In some instances, a ratio of an area of the hollow 83 to an area of the cell 93 in that cross-sectional plane is equal to or greater than 20%, 30%, 35%, 40%, 45% or 50%. Note that, thermal expansion coefficient of the bonding material 81 differs from thermal expansion coefficient of the cell-wall 94. Coefficient of thermal expansion of ceramic material of the ceramic base body may be equal to or less than $2 \times 10^{-6}$/K. Coefficient of thermal expansion of the bonding material 81 may be $3 \times 10^{-6}$/K to $6 \times 10^{-6}$/K. In a preferred instance, thermal expansion coefficient of the bonding material 81 is equal to or less than $4 \times 10^{-6}$/K and has a value closer to the thermal expansion coefficient of ceramic material of the ceramic base body 90.

As illustrated in FIGS. 7 and 8, the metal particles or metal fragments 82 are dispersed in the coating layer 80 formed on the inner surface of the cell 93. The metal particles or metal fragments 82 are dispersed around the above-described hollow 83 in the coating layer 80 formed on the inner surface of the cell 93. Heat generated by metal particles or metal fragments 82 is transmitted to the cell-wall 94 via the bonding material 81. Along with increase in temperature of the cell-wall 94, the internal space of the catalyst cells 93C will be heated. As the metal particles or metal fragments 82 exist around the hollow 83, heat generated by each of the metal particles or metal fragments 82 will be efficiently transmitted to the surrounding cell-wall 94.

FIG. 9 is a schematic view showing a state in which catalyst layers 97 have been introduced into cells 93 of the ceramic base body 90 other than the selected cells 93 into which metal particles or metal fragments 82 had been introduced. The catalyst layer 97 may be a ternary catalyst that supports platinum-based metal catalyst particles in fine pores of beta-alumina, and etc. Similar to above descriptions, wash-coating method, injection or pressure-applied pouring can be employed as a method of introducing a catalyst into the cells 93 of the ceramic base body 90.

Description will be made for a non-limiting method of manufacturing a catalyst substrate with reference to FIGS. 10 and 11. In an instance shown in FIG. 10, firstly, a ceramic base body 90 is manufactured (S1). As described above, a clay may be molded through extrusion, dried and then fired, so that a ceramic base body 90 is obtained. Next, first open ends of selected cells 93 of the ceramic base body 90 are sealed (S2). For example, the first open end of cell 93 is sealed by a sealing material of the same raw material as the ceramic base body 90, and then it is fired. Next, a multiplicity of metal particles is supplied into the selected cell 93 via unsealed second open ends of the selected cells 93 (S3). Next, the second open ends of the cells 93 into which the multiplicity of metal particles has been introduced are sealed (S4). For example, the second open end of the cell 93 is sealed by a sealing material of the same raw material as the ceramic base body 90, and then it is fired.

In an instance shown in FIG. 11, firstly, the ceramic base body 90 is manufactured (S1). As described above, a clay may be molded through extrusion, dried and then fired, so that a ceramic base body 90 is obtained. Next, a slurry is introduced into selected cells 93 of the ceramic base body 90 (S2).

As illustrated in FIG. 12, covers 71 are placed on respective terminal surfaces of the ceramic base body 90. The ceramic base body 90 is sandwiched by the covers 71, and respective open ends of cells 93 of the ceramic base body 90 are closed by the cover 71. Next, as illustrated in FIG. 13, apertures 72 are selectively formed in the cover 71. The aperture 72 is formed at a position that corresponds to a selected cell 93 that will be a heating cell 93H and allows a slurry to flow into a cell 93. The slurry is introduced into a selected cell 93 via the aperture 72. The cover 71 may be a resin or plastic sheet having one surface on which an adhesive agent is coated.

As illustrated in FIG. 14, the slurry may flow into the selected cell 93 of the ceramic base body 90 via the aperture 72 formed in the cover 71 placed on the terminal surface of the ceramic base body 90. In some instances, in order to confirm that sufficient amount of slurry has been injected into the cell 93, the aperture may be formed at a cover at the opposite side relative to a side at which the slurry is injected. By confirming that the slurry flows out via this opposite-side aperture, it would be possible to assume that sufficient amount of slurry has been injected into the cell 93. That is, supply of the slurry may be ended when the slurry flows out of the selected cell 93 via the aperture in the cover at the opposite side. Forming the apertures in the cover 71 may be done by using a laser device, but should not be limited to this.

In some instances, in the ceramic base body 90 in which the slurry has been introduced into the selected cells 93, a porous body of the ceramic base body 90 may absorb dispersion medium, e.g. water, and a layer mainly consisting of solid content may be formed on the cell-wall 94 of the ceramic base body 90. The fluidity of the slurry may be low and could be said as zero. Drying this ceramic base body 90 allows that the solid content of the slurry is bonded to the cell-wall 94 of the ceramic base body 90 (S3). In or after the step of drying, the cover 71 may be removed from the ceramic base body 90. The solid content of the slurry is bonded to the cell-wall 94, and thus the solid content of the slurry may not drop off the selected cell 93 even after the cover 71 is removed.

Next, optionally, an open end of the selected cell 93 of the ceramic base body 90 is sealed by a sealing material (S4). For example, the first and/or second open end of the cell 93 is sealed by a sealing material of the raw material that is identical to the raw material of the ceramic base body 90.

Next, after fluidity of the slurry is lowered, the ceramic base body 90 is thermally processed (S5). For example, the ceramic base body 90 is thermally processed in vacuum. Accordingly, the bonding material (i.e. glass) in the slurry is fired and bonded to the cell-wall 94 of the ceramic base body 90 (See FIG. 15). Also, optional sealing material may be bonded to the ceramic base body 90 through firing.

It is also envisaged that a slurry is introduced into the selected cells 93 as illustrated in FIGS. 16 to 18. Firstly, similar to above, a clay is introduced into a selected cell 93 via the aperture 72 formed in the first cover 71 on the terminal surface of the ceramic base body 90. The clay may be pressed against the first cover 71 so that the clay is pressed into the selected cell 93 via the aperture 72 in the first cover 71. Next, the ceramic base body 90 in which one open ends (i.e. first open ends) of selected cells 93 have been sealed by the clary is dried. Accordingly, the clay at one open end (i.e. first open ends) of the selected cell 93 will be hardened and bonded to the ceramic base body 90.

Next, as illustrated in FIG. 17, the first cover at the side the sealing portions 96 have been formed is removed. Next, as illustrated in FIG. 18, a slurry is introduced into the selected cells 93 via the other open ends (i.e. second open ends) of selected cells 93 not being sealed by the sealing portion 96. Specifically, the slurry may be introduced into the selected cell 93 via the aperture 72' in the second cover 71'. The slurry introduced here may include at least metal particles and dispersion medium, and may have optionally glass particles and dispersant. It may be preferred to decrease the concentration of solid content included in the slurry.

The dispersion medium included in the slurry introduced into the selected cells 93, e.g. water may flow into neighboring cells 93 around the selected cell 93 via the porous cell-wall 94 and may flow out of the ceramic base body 90 via that neighboring cells 93. On the other hand, the solid content included in the slurry cannot pass through the porous cell-wall 94, and may be accumulated within the selected cell 93, i.e. the porous cell-wall 94 (See the schematic view of FIG. 18). The ceramic base body 90 obtained as such would be thermally processed, and the solid content is fired and bonded to the cell-wall 94. An embodiment is envisaged in which an open end of the selected cell 93 at the side at which the slurry was introduced is further sealed by a sealing portion.

WORKING EXAMPLE 1

A cylindrical ceramic base body made of cordierite having a diameter of 82 mm and a length of 85 mm was manufactured. The thickness of the cell-wall was 100 µm, and the density of cells was 62 cell/cm². Next, covers were placed on the respective terminal surfaces of the ceramic base body so that it is sealed. Next, a laser device was used to form apertures in respective covers. Holes were formed at positions corresponding to open ends of cells 93 that will be heating cells 93H. The apertures were formed in the cover at intervals of 5 cells in longitudinal and lateral directions at each terminal surface of the ceramic base body. That is, the apertures were formed at a ratio of 1 cell per 25 cells (5*5 cells). The apertures were formed in respective covers placed on respective terminal surfaces of the ceramic base body at the opposite positions with respect to the same cell. Next, a slurry including ferritic stainless-steel particles (average particle diameter is 10 µm), silica-based glass particles (average diameter is 2 µm), a dispersant, and water was injected into the cells via the apertures. The slurry had a weight ratio of ferritic stainless-steel particles/silica-based glass particles/dispersant/water=66/33/1/140. The injection of the slurry ended at a timing when the slurry flowed out via the aperture in the cover at the opposite side relative to a side at which the slurry was injected. The catalyst substrate was thereafter dried for an hour at 120° C. Next, the catalyst substrate was thermally processed for an hour in vacuum at 1100° C. A coating layer having a thickness of 35 µm was obtained. The weight of the coating layer in the entire catalyst substrate was 6.8 gram.

WORKING EXAMPLE 2

A slurry having a weight ratio of ferritic stainless steel particles/silica-based glass particles/dispersant/water=66/33/1/35 was used. Other conditions were the same as the working example 1. A coating layer having a thickness of 100 µm was obtained. The weight of the coating layer in the entire ceramic base body was 19.0 gram.

WORKING EXAMPLE 3

Ferritic stainless steel particles having average particle diameter of 100 µm were used. Other conditions were the same as the working example 1. A coating layer having a thickness of 33 µm was obtained. The weight of the coating layer in the entire ceramic base body was 7.0 gram.

WORKING EXAMPLE 4

Ferritic stainless steel particles having average particle diameter of 100 µm were used. Also, a slurry having a weight ratio of ferritic stainless-steel particles/silica-based glass particles/dispersant/water=66/33/1/400 was used. Other conditions were the same as the working example 1. A coating layer having a thickness of 94 µm was obtained. The weight of the coating layer in the entire ceramic base body was 17.5 gram.

WORKING EXAMPLE 5

A cylindrical ceramic base body made of cordierite having a diameter of 82 mm and a length of 85 mm was manufactured. The thickness of the cell-wall was 100 µm, and the density of cells was 62 cell/cm². Next, covers were placed on the respective terminal surfaces of the ceramic base body so that it is sealed. Next, a laser device was used to form apertures in respective covers. Holes were formed at positions corresponding to open ends of cells 93 that will be heating cells 93H. The apertures were formed in the cover at intervals of 5 cells in longitudinal and lateral directions at each terminal surface of the ceramic base body 90. The apertures were formed at a ratio of 1 cell per 25 cells (5*5 cells). The apertures were formed in respective covers placed on respective terminal surfaces of the ceramic base body at the opposite positions with respect to the same cell. Next, a sealing material was pressed into a cell at which the aperture is formed at one of the terminal surfaces, and then it is dried to form a sealing portion. From the opposite terminal surface, a mixed power including ferritic stainless-steel particles (average particle diameter is 100 µm) and silica-based glass particles (average diameter is 2 µm) was injected into the cell via the aperture in the cover while being vibrated. After that, a sealing material was pressed into the aperture through which the power had been injected, and then it was dried so that the powder was blocked from spilling out. The cover was removed thereafter and, through thermal processing for an hour at 950° C. in nitrogen atmosphere, the stainless particles were bonded to the cell-wall of the ceramic base body via glass and the bonding material (i.e. glass) was bonded to the ceramic base body. In this example, ferritic stainless-steel particles having average particle diameter of 100 µm were used. Also, the mixed power used had a weight ratio of ferritic stainless-steel particles/silica-based glass particles=90/10. The weight of the mixed power was 40.0 gram.

WORKING EXAMPLE 6

A cylindrical ceramic base body made of cordierite having a diameter of 82 mm and a length of 85 mm was manufactured. The thickness of the cell-wall was 100 µm, and the density of cells was 62 cell/cm$^2$. The porosity of the cell-wall was 28%, and the average diameter of narrow pores was 1 µm. Next, covers were placed on the respective terminal surfaces of the catalyst substrate so that it is sealed. Next, a laser device was used to form apertures in respective covers. Holes were formed at positions corresponding to open ends of cells 93 that will be heating cells 93H. The apertures were formed in the cover at intervals of 5 cells in longitudinal and lateral directions at each terminal surface of the ceramic base body 90. That is, the apertures were formed at a ratio of 1 cell per 25 cells (5*5 cells). The apertures were formed in respective covers placed on respective terminal surfaces of the ceramic base body at the opposite positions with respect to the same cell. Next, a clay including cordierite particles and colloidal silica was rubbed via the aperture in the cover at one end of the ceramic base body to reach 3 mm depth, and then it was dried at 200° C. to form the sealing portion, and the cover at that end was peeled off. Then, a slurry was injected into the cells via the apertures in the cover at a terminal surface of ceramic substrate at which the apertures-provided-cover remained, and a step in which water is discharged from the opposite terminal surface continued until the volume of drain water reached 600 cc. The injecting speed of the slurry was 20 cc/sec, and the time period of injection of slurry was 30 seconds. The slurry included ferritic stainless-steel particles (average particle diameter is 10 µm), silica-based glass particles (average diameter is 2 µm), a dispersant, and water. The weight ratio was as follows, ferritic stainless steel particles/silica-based glass particles/dispersant/water=66/33/1/1000. The catalyst substrate was thereafter dried for an hour at 120° C. Next, the catalyst substrate was thermally processed for an hour at 1100° C. The weight of the fillings in the entire ceramic substrate was 37.0 kg.

In every working example, the metal particles were successfully introduced and fixed within the selected cells 93.

Given the above teachings, a skilled person in the art would be able to add various modifications to the respective embodiments.

What is claimed is:

1. A substrate comprising:
a ceramic base body including first and second ends, the second end being opposite to the first end, and the ceramic base body being provided with a plurality of cells each extending between the first and second ends; and a plurality of metal particles or metal fragments introduced into one or more internal spaces of one or more selected cells in the plurality of cells, the metal particles or metal fragments including metal particles or metal fragments of ferritic stainless steel and/or martensitic stainless steel, austenitic stainless steel, invar or super invar; and the number of selected cells being less than the number of non-selected cells, wherein each of the plurality of metal particles or metal fragments has a size equal to or less than an opening width of the cell and is configured to generate heat in accordance with varying magnetic field, wherein (i) or (ii) or (iii) is satisfied:

(i) the selected cell is occupied by the plurality of metal particles or metal fragments entirely between the first and second ends, (ii) the plurality of metal particles or metal fragments are bonded to one another and to the ceramic base body via a bonding material in the internal space of the selected cell, and (iii) a coating layer, where the metal particles or metal fragments are dispersed, is formed on an inner surface of a cell-wall of the selected cell, wherein the first end and/or the second end is provided with a plurality of sealing portions, each of the plurality of sealing portions including ceramic material and being configured to seal an open end of the selected cell and to prevent a catalyst from flowing into the select cell, and wherein said metal particles or metal fragments are not included in each of the plurality of sealing portions.

2. The substrate of claim 1, wherein the substrate consists of cordierite, and the plurality of sealing portions consist of cordierite.

3. The substrate of claim 1 in which (iii) is satisfied, wherein a hollow exists in at least one selected cell, in which the coating layer has been formed, in a cross-sectional plane orthogonal to an extending direction of the ceramic base body between the first and second ends, and a ratio of an area of the hollow to an area of the cell in the cross-sectional plane is equal to or greater than 20%.

4. The substrate of claim 3, wherein a ratio of an area of the hollow to an area of the cell in the cross-sectional plane is equal to or greater than 50%.

5. The substrate of claim 1, wherein the metal particles or metal fragments each has an average particle size equal to or less than 100 µm.

6. The substrate of claim 1, wherein thermal expansion coefficient of ceramic material of the ceramic base body is equal to or less than $2\times10^{-6}$/K.

7. The substrate of claim 1, wherein initial permeability of metal material of the metal particle or metal fragment is equal to or greater than $5\times10^{-5}$H/m.

8. The substrate of claim 1, wherein a thickness of the cell-wall is equal to or less than 0.2 mm.

9. An exhaust gas purification apparatus, comprising:
an exhaust gas purification device that comprises a substrate of claim 1, and a catalyst supported by the catalyst substrate; and
a coil wiring that spirally surrounds the exhaust gas purification device.

10. A method of manufacturing a catalyst substrate, comprising:
preparing a ceramic base body including first and second ends, the second end being opposite to the first end, and the ceramic base body being provided with a plurality of cells each extending between the first and second ends; and introducing a plurality of metal particles or metal fragments into respective internal spaces of a plurality of selected cells in the plurality of cells of the ceramic base body, the metal particles or metal fragments including metal particles or metal fragments of ferritic stainless steel and/or martensitic stainless steel, austenitic stainless steel, invar or super invar; and the number of selected cells being less than the number of non-selected cells, wherein each of the plurality of metal particles or metal fragments has a size equal to or less than an opening width of the cell and is configured to generate heat in accordance with varying magnetic field, and the method further comprises forming a plurality of sealing portions at the first end and/or the second end, each of the plurality of sealing portions including ceramic material and being configured to seal an open end of the selected cell, and to prevent a catalyst from flowing into the cell, and wherein said metal particles or metal fragments are not included in each of the plurality of sealing portions.

11. The method of claim 10, wherein slurry including at least the plurality of metal particles or metal fragments, powder of bonding material, and dispersion medium is introduced into the respective selected cells.

12. The method of claim 11, wherein the dispersion medium of the slurry flows into one or more adjacent cells at least through a cell-wall of the selected cell such that a solid content accumulates inside the selected cell.

13. The method of claim 12, wherein said forming a plurality of sealing portions at the first end and/or the second end comprises:
introducing a clay into the selected cell through an aperture formed in a cover placed on a terminal surface of the ceramic base body; and
drying the ceramic base body.

14. The method of claim 11, wherein first and second covers are placed onto respective terminal surfaces at the first and second ends, the slurry is introduced into the selected cell through an aperture formed in the first cover, and the introducing of the slurry ends when the slurry flows out of the selected cell via an aperture formed in the second cover.

* * * * *